United States Patent
Chemudugunta et al.

(10) Patent No.: US 12,001,260 B1
(45) Date of Patent: Jun. 4, 2024

(54) PREVENTING INADVERTENT WAKE IN A SPEECH-CONTROLLED DEVICE

(71) Applicant: Amazon Technologies, Inc., Seattle, WA (US)

(72) Inventors: Ravi Chemudugunta, Vancouver (CA); John Ryan Sherritt, Seattle, WA (US); David Henry, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 327 days.

(21) Appl. No.: 17/118,813

(22) Filed: Dec. 11, 2020

(51) Int. Cl.
*G06F 1/32* (2019.01)
*G06F 1/3231* (2019.01)
*G06F 1/3287* (2019.01)
*G06F 3/16* (2006.01)
*G10L 13/02* (2013.01)
*G10L 15/08* (2006.01)

(52) U.S. Cl.
CPC .......... *G06F 1/3231* (2013.01); *G06F 1/3287* (2013.01); *G06F 3/16* (2013.01); *G10L 13/02* (2013.01); *G10L 15/08* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 6,314,520 B1 * | 11/2001 | Schell | H04L 61/35 726/13 |
| 10,186,265 B1 * | 1/2019 | Lockhart | G10L 15/32 |
| 2019/0043492 A1 * | 2/2019 | Lang | H04N 21/42203 |
| 2020/0090646 A1 * | 3/2020 | Smith | G10L 15/22 |
| 2020/0202843 A1 * | 6/2020 | Shah | H04L 65/80 |
| 2020/0258512 A1 * | 8/2020 | Smith | G06F 3/167 |

* cited by examiner

*Primary Examiner* — Danny Chan
(74) *Attorney, Agent, or Firm* — Pierce Atwood LLP

(57) ABSTRACT

A speech-processing system may provide access to one or more virtual assistants via a voice-controlled device. The system may be activated by detecting a wakeword in speech received by a microphone of the device. The system may process the speech and provide a response in the form of synthetic speech. When a speaker of the device synthetic emits the speech, the microphone may detect some or all of the speech. If the synthetic speech includes a wakeword or words or phrases similar to the wakeword, a wakeword detection component of the device may detect the wakeword and activate an assistant, resulting in a self-wake or cross-wake. Self- or cross-wake may interrupt an action or response currently in progress, which may frustrate the user and result in a poor user experience. This disclosure thus proposes systems and methods for preventing cross-wake and self-wake in a voice-controlled device.

17 Claims, 15 Drawing Sheets

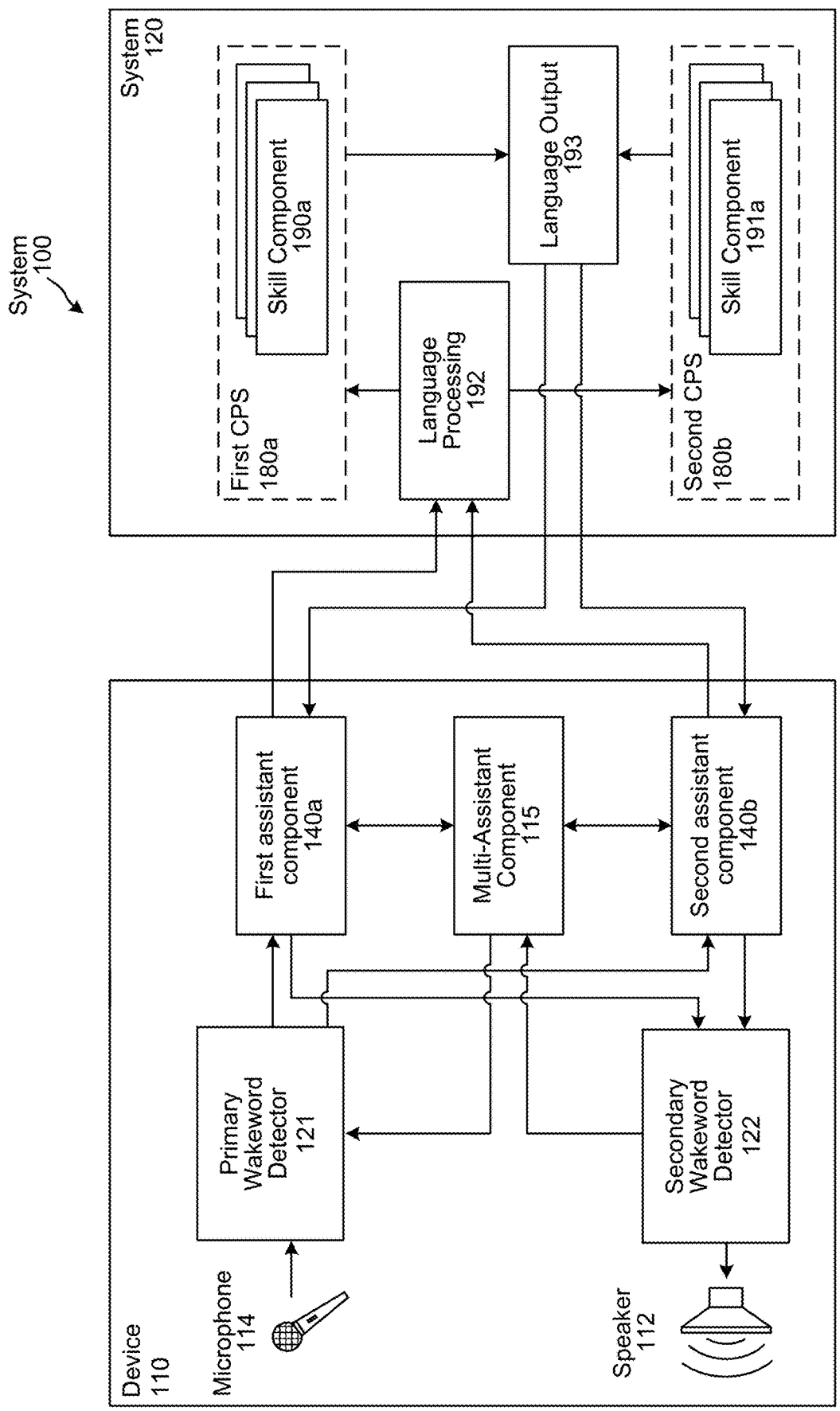

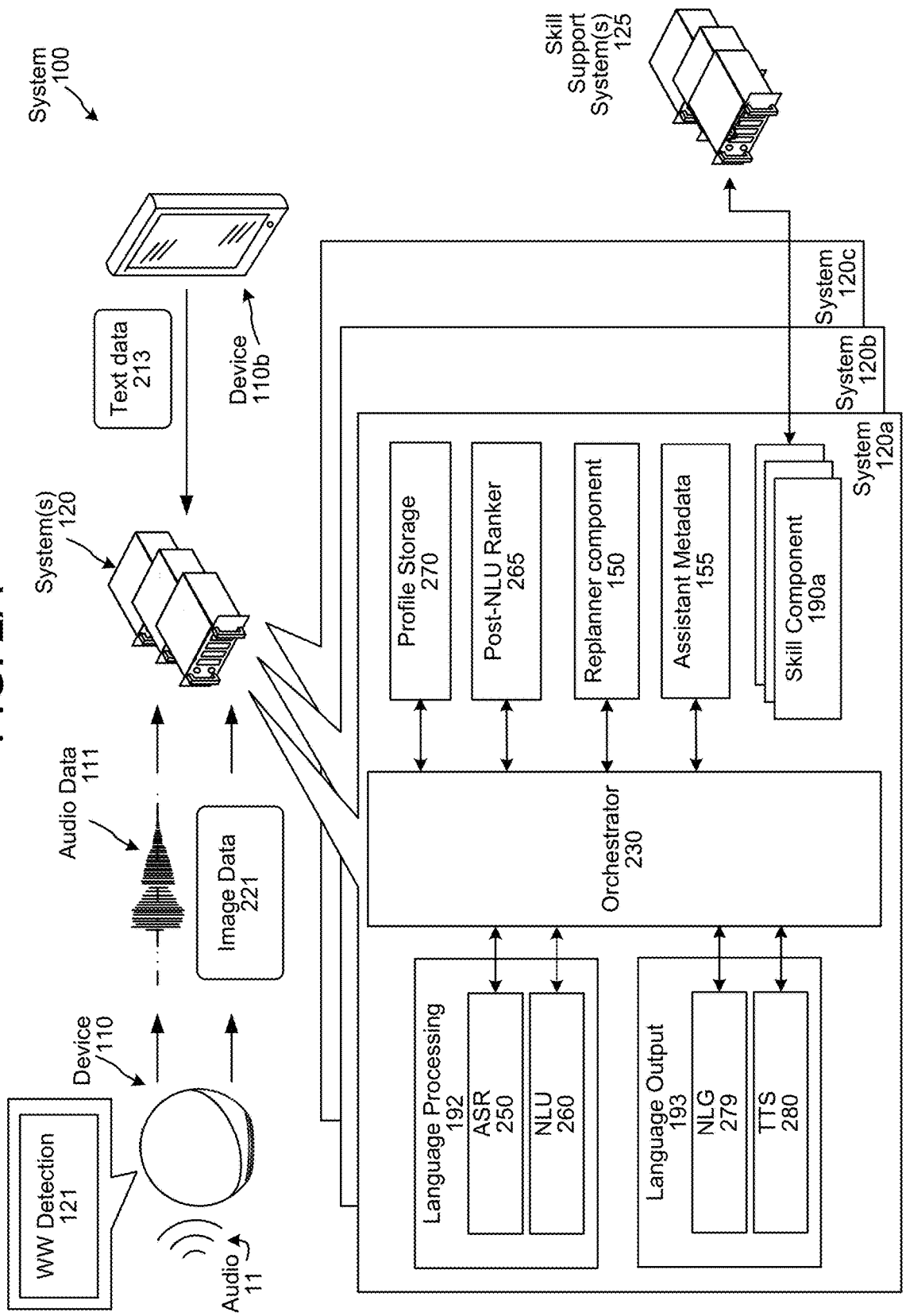

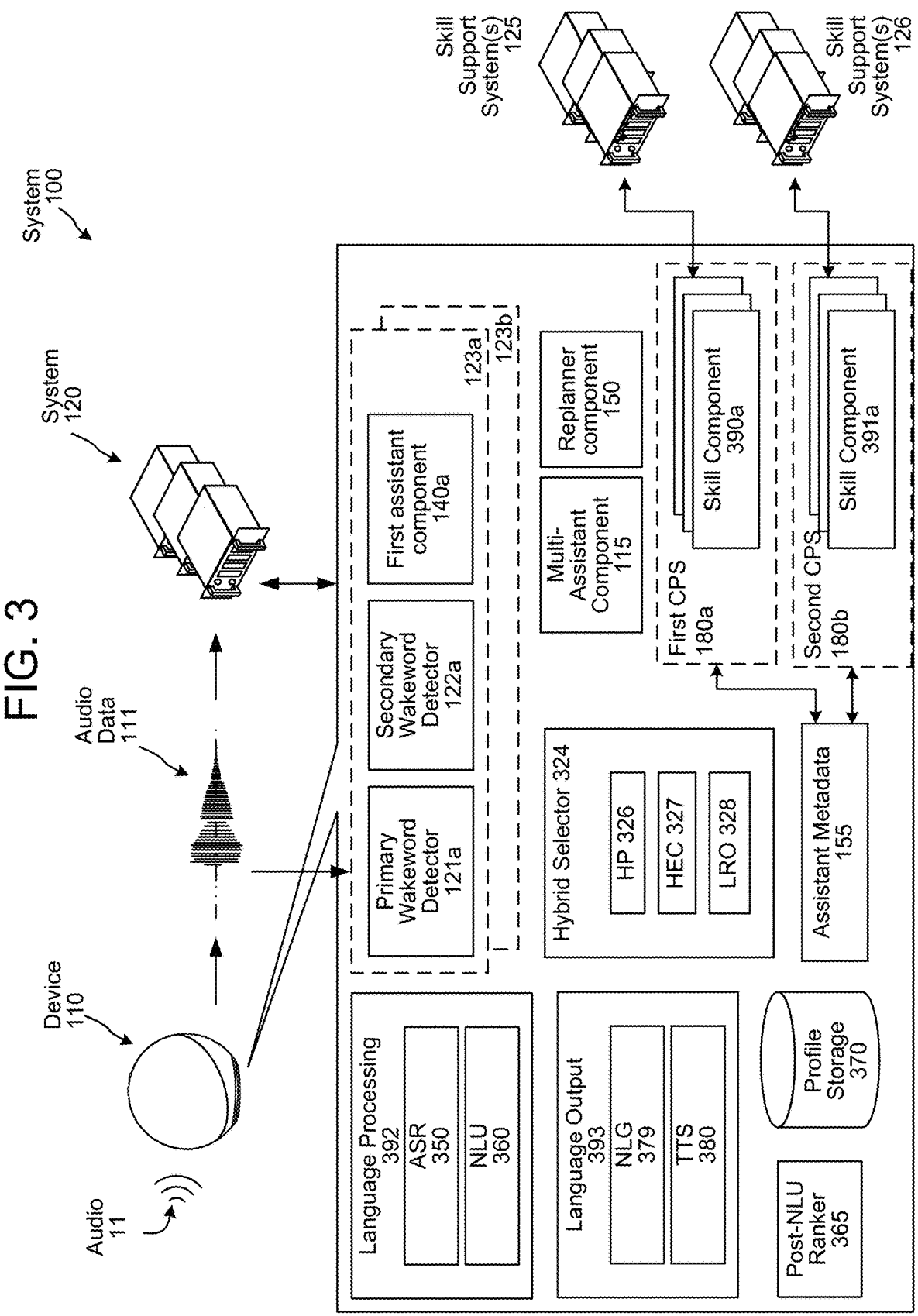

PREVENTING INADVERTENT WAKE IN A SPEECH-CONTROLLED DEVICE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B is a conceptual diagram illustrating the interaction of the components of the virtual assistant system, according to embodiments of the present disclosure.

FIG. 2A is a conceptual diagram illustrating components of the virtual assistant system, according to embodiments of the present disclosure.

FIG. 3 is a conceptual diagram illustrating components that may be included in a device of the virtual assistant system, according to embodiments of the present disclosure.

DETAILED DESCRIPTION

Figure 1A:
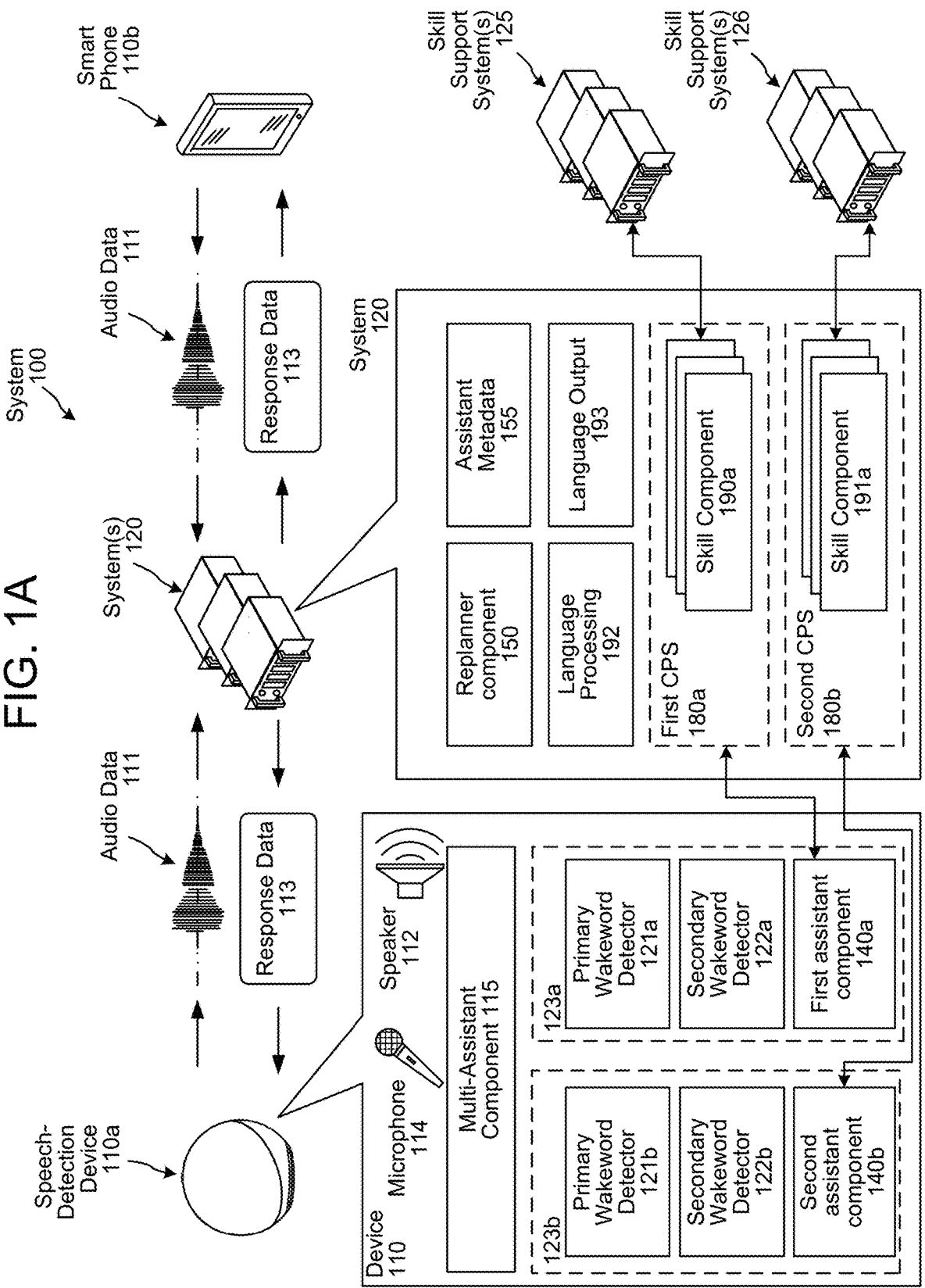
FIG. 1A is a conceptual diagram illustrating components of a virtual assistant system with features for preventing self-wake and cross-wake, according to embodiments of the present disclosure.

Speech processing systems and speech generation systems can be combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text or other type of word representative data of that speech. Similarly, natural language understanding (NLU) is a field of computer science, artificial intelligence, and linguistics concerned with enabling computers to derive meaning from text or other natural language meaning representation data. ASR and NLU are often used together as part of a speech processing system, sometimes referred to as a spoken language understanding (SLU) system. Text-to-speech (TTS) is a field of computer science concerning transforming textual and/or other meaning representation data into audio data that is synthesized to resemble human speech. ASR, NLU, and TTS may be used together to act as a virtual assistant that can respond to spoken commands and respond with synthesized speech. For example, a voice-controlled user device and/or a speech-processing system may be configured to receive human speech and detect a wakeword used to activate the device and/or other transcribable language in the user input. The device and/or system may determine a command represented by the user input, and use TTS to provide a response in the form of synthesized speech.

In some cases, however, the synthesized speech may include the wakeword. When the device emits the synthesized speech from a speaker, a microphone of the device may receive the audio, and a wakeword detector may detect the wakeword and activate the device. In response, the device may interrupt the synthesized speech and/or an action performed in response to the command. This type of interruption may be referred to as a self-wake. In some embodiments, the device may respond to more than one wakeword; for example, when the device is configured to provide access to more than one virtual assistant. When a synthesized speech response from a first assistant includes the wakeword of a second assistant, detection of the wakeword may cause the device to interrupt the first assistant and activate the second assistant. This type of interruption may be referred to as a cross-wake. Preventing such interruptions may improve the user experience. Coupled with echo cancelation circuitry and processing, the user experience can be further improved.

In some implementations, the device may first detect a first assistant's wakeword in a response from a different assistant's system, and then ignore that wakeword.

In some implementations, the system may include a multi-assistant component that manages operations between the device and respective speech processing components and/or systems (e.g., of a command processing subsystem (CPS) and/or speech-processing system), where each speech processing component may be associated with one or more assistants. The system may include assistant-specific components that may transfer data to and from their respective speech processing components under the control of the multi-assistant component. In some implementations, the assistant-specific components may send requests to initiate dialog sessions to the multi-assistant component. The multi-assistant component may selectively approve or deny such requests to, for example, prevent respective systems from observing each other's activities, such as receiving input audio directed toward another system, or receiving output audio provided by another system. To prevent cross-wake and/or self-wake, the multi-assistant component may deny a request to initiate a dialog session if the wakeword associated with the requesting system has been detected in response data from the same or a different system. Following detection of a wakeword in response data, the multi-assistant component may deny requests to initiate dialog sessions received from the system corresponding to the wakeword.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a conceptual diagram illustrating components of a virtual assistant system with features for preventing self-wake and cross-wake, according to embodiments of the present disclosure. The various components may be located on same or different physical devices. Communication between various components may occur directly or across a network(s) 199. The system 100 may include one or more voice-controlled devices 110 in communication with a speech-processing system 120 (abbreviated "system 120"). The voice-controlled devices may include, for example, a speech-detection device 110a and/or a smart phone 110b. Other devices 110 such as those illustrated in FIG. 13 and described below with reference to FIG. 11 may be used. As described in greater detail below, the device 110 may include one or more wakeword management components 123a and 123b (collectively "wakeword management components 123"). The wakeword management components 123 may include one or more detectors for detecting one or more wakewords such as a primary wakeword detector 121a or 121b, and a secondary wakeword detector 122a or 122b. The device 110 may include only a single wakeword detector 121 or more wakeword detectors, which may collectively referred to as "wakeword detectors 121." Although referred to as primary and/or secondary, each wakeword detector 121/122 may perform the same or similar operations. In some implementations, the wakeword management components 123a and/or 123b may detect multiple wakewords, including wakewords for different CPSs 180 and/or speech-processing systems 120. In some implementations, the system 100 may include multiple wakeword management components 123, each configured to detect a wakeword for a single CPS 180 or speech-processing system 120. For example, as illustrated in FIGS. 1A and 2A, one set of wakeword components (121a and 122a) may correspond to a first CPS 180a and be configured to detect the wakewords associated with the first CPS 180a while another set of wakeword components (121b and 122b) may correspond to a second CPS 180b and thus be configured to detect the wakewords associated with the second CPS 180b. As can be appreciated, the device 110 may include multiple wakeword detection components 121n/122n depending on the number of CPSs the device 110 may be configured to operate with. The wakeword management components 123 may further include an assistant-specific component 140a or 140b as described further below.

In some implementations, a primary wakeword detector 121 and a secondary wakeword detector 122 may be configured to detect the same wakeword(s) (e.g., the same wakewords for a same CPS so that primary wakeword detector 121a and secondary wakeword detector 122a may be configured to detect the same wakeword(s) as those associated with first CPS 180a, while primary wakeword detector 121b and secondary wakeword detector 122b may be configured to detect the same wakeword(s) as those associated with second CPS 180b, and so forth). The device 110 may include a microphone 114 for receiving an audio signal and a speaker 112 for emitting an audio signal. In some implementations, the primary wakeword detector 121 may be configured to detect a wakeword in audio data received by the microphone 114, and the secondary wakeword detector 122 may be configured to detect a wakeword in response data 113 received from the system 120 prior to output by the speaker 112. The wakeword detector 121 may determine that audio data corresponding to the audio contains a representation of a wakeword (as described in greater detail below); the device 110 may thereafter send the audio data to the system(s) 120. An example wakeword is "Alexa." The device 110 may instead or in addition send the audio data to the system(s) 120 when the device detects an input, such as a key press, button press, or touch-screen touch. An example button is a "Push to Talk" button. The device 110 may be capable of differentiating gestures. A gesture may be a non-verbal movement detectable by the device 110; for example, tap-to-talk, push-and-hold, double-click, etc. Wakewords and gestures may collectively be referred to as wake commands. The device 110, when activated with a wake command, may receive audio and send corresponding audio data 111 to the server 120; e.g., as raw audio data, text data, a phonetic representation of the command, etc. As described in FIG. 3, however, additional language processing and command execution operations can be performed on the device 110, and the disclosure is not limited by whether the device 110 and/or system 120 performs operations described herein.

Once the device detects a wake command, the device 110 may begin transmitting the audio data 111 to the system(s) 120. The wakeword management components 123a and 123b may include assistant-specific components 140, such as a first assistant component 140a and a second assistant component 140b, respectively, that may transmit the audio data 111 to the system 120. The audio data 111 may include data corresponding to the wakeword; in other embodiments, the portion of the audio corresponding to the wakeword is removed by the device 110 prior to sending the audio data 111 to the system(s) 120. In the case of touch input detection, the audio data 111 may not include a wakeword. The device 110 may be equipped with a camera for capturing image data. The device 110 and/or the system 120 may process the image data for purposes of gesture detection (e.g., when the gesture does not include touching a touch- or force-sensitive component), for user recognition, or for detecting context (e.g., is it day/night). The device 110 may additionally receive text input (or generate text data based on an input) and transmit the text data to the system 120.

The device may include one or more assistant-specific components 140 such as the first assistant component 140*a* and the second assistant component 140*b*. An assistant-specific component 140 may be an application executing on the device 110 and perform operations related to providing virtual assistant services via the device 110. An assistant-specific component 140 may receive wakeword detection signals and transfer data to and from a respective CPS 180 and/or speech-processing system 120. The device 110 may include one assistant component 140 for each CPS 180 the device 110 is configured to operate with.

The device 110 may include a multi-assistant component 115. The multi-assistant component 115 may control operations of the assistant-specific components 140 including their interaction with their corresponding CPS 180 and/or speech-processing system 120. The multi-assistant component 115 may receive and process requests to enable and/or disable a CPS 180, such as the first CPS 180*a* and/or the second CPS 180*b* for handling commands received by the device 110. The multi-assistant component 115 may retrieve information regarding eligible CPSs from system 120 to provide the user with a list of assistants that may be available for use with the voice-controlled device 110. The multi-assistant component 115 may process changes in assistant settings, such as setting CPS-specific wake commands such as wakewords and/or gestures. The multi-assistant component 115 may include or be coupled to a storage component that may store representations of the wakewords for use in detecting the wakewords in future input and/or response data by, for example, the primary wakeword detector 121 and/or the secondary wakeword detector 122. In some implementations, the multi-assistant component 115 may provide an application programming interface (API) that an assistant-specific component 140 and/or a CPS 180 may use to register a wakeword such that the device 110 can detect it in future input and/or response data, including for use in preventing self-wake and/or cross-wake.

The multi-assistant component 115 may perform operations to prevent self-wake and/or cross-wake. In some implementations, the multi-assistant component 115 may receive an indication of a wakeword detected in response data 113 and send an instruction to a wakeword detector 121 and/or an assistant-specific component 140 to ignore an instance of that wakeword subsequently detected in received audio data 111 such that an assistant-specific component 140 associated with the wakeword does not send the audio data 111 to the system 120.

In some implementations, the multi-assistant component 115 may manage dialog sessions; for example, to control when and how an assistant-specific component 140 may transmit data to its CPS 180. A "dialog" or "dialog session" as used herein may refer to data transmissions (such as relating to multiple user inputs and system(s) 120 outputs) between the system(s) 120 and a local device (e.g., the device 110) that all relate to a single originating user input. Thus, the data transmissions of a dialog session may share a dialog identifier or other unique identifier that may be used by the orchestrator component 230, skill component(s) 190, skill server(s) 125, etc. to track information across the dialog session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialog session related to the originating user input "play jeopardy." In some examples, a dialog-initiating user input may start with a wakeword and end with a command, such as "Alexa, play jeopardy," where "Alexa" is the wakeword and "play jeopardy" is the command. Subsequent user inputs of the same dialog session may or may not start with speaking of a wakeword. Each user input of a dialog may be associated with a unique user input identifier such that multiple user input identifiers may be associated with a single dialog session identifier.

The multi-assistant component 115 may maintain state information about dialog sessions. The multi-assistant component 115 may include or couple to a memory. The multi-assistant component 115 can store the state information in the memory. Upon receiving an indication of a wakeword detected in audio data 111, an assistant-specific component 140 may send to the multi-assistant component 115 a request to initiate a dialog session between the device 110 and the system 120. The multi-assistant component 115 may approve or deny the request based on, for example, whether the multi-assistant component 115 previously received an indication of a wakeword in response data 113 or whether a different assistant-specific component 140 is currently engaged in a dialog session. When the multi-assistant component 115 approves initiation of the dialog session, it may store data regarding the dialog session in the memory. Such dialog session data may include, for example, a dialog ID, an account ID of the user of the device 110, an assistant ID of the CPS 180, (e.g., listening, processing, speaking, etc.), utterance IDs of utterances in the dialog session, a current status of the CPS 180, etc. The multi-assistant component 115 may refer to the status information in the data for an ongoing dialog session when determining whether to approve a request for an initiation of a second dialog session involving a different CPS 180; for example, the multi-assistant component 115 may deny the request of a current status is "listening" or "processing." While it may be desirable to prevent activation of a second CPS 180*b* while a first CPS 180*a* is listening or processing, it may be desirable to allow a user to interrupt a response currently being output by the device 110. Accordingly, the multi-assistant component 115 may approve initiation requests received when the first CPS 180*a* is responding, as long as the initiation requests are not based on a wakeword present in response data output by the device 110.

In order to prevent self-wake or cross-wake, the multi-assistant component 115 may store occurrences of wakewords detected in the response data. Upon receiving an indication that a representation of a wakeword was detected in response data, the multi-assistant component 115 may configure a setting in the memory—such as setting a register—to prevent the multi-assistant component 115 from approving a dialog request from an assistant-specific component 140 associated with the detected wakeword. The configured setting may including timing information relating to when the response data will be output by the device 110, and thus received by the microphone 114. In some implementations, the timing data may be based on the format of the response data; for example, if the response data is raw text, the multi-assistant component 115 may be unable to determine a precise time interval in which the device 110 will output the wakeword, and thus configure the setting to deny requests until the device 110 finish outputting the entire response. In some implementations, the response data may including more precise timing information, such as is included in speech synthesis markup language (SSML) or similar format. With such timing information, the multi-assistant component 115 may be able to configure the setting to ignore requests received during an interval of time when the wakeword itself is output by the device 110. In some implementations, the multi-assistant component may use the timing information to instruct one or more other components, such as the primary wakeword detector 121 and/or an assistant-specific component 140 to ignore the audio or detection of the wakeword during a time interval when the wakeword is expected to be output. After the time interval has elapsed, or when the device 110 has finished outputting the response data, the multi-assistant component 115 may update the state data, for example, by resetting the configured setting, to allow activation of an assistant based on subsequent detections of a wakeword. Operations of the assistant-specific components 140 and the multi-assistant component 115 are discussed in additional detail below with reference to FIG. 1B, FIG. 2B and FIGS. 4 through 6.

The system 120 may include speech processing components including components for ASR, NLU, TTS, etc. as further detailed below with reference to FIG. 2A. The system 120 additionally includes components configured to process commands received in a multi-assistant environment. In particular, the system 120 includes a replanner component 150, the assistant metadata component 155, a first CPS 180a, and a second CPS 180b. The first CPS 180a may be associated with one or more skill components 190a, 190b, and 190c (collectively "skill components 190"), and the second CPS 180b may be associated with one or more skill components 191a, 191b, and 191c (collectively "skill components 191"). The system 120 is not limited to two CPSs, and in some implementations may include many CPSs. In some embodiments, one or more skill components 190 or 191 may be shared between two or more CPSs. In some embodiments, the system 120 may include more or fewer skill components 190 or 191, including skill components for additional CPSs. The skill components 190 and/or 191 may communicate with one or more skill support systems 125 or 126, which may augment the resources of the skill components 190 or 191, respectively.

A CPS 180 may include software and/or logic configured to provide the functions of a virtual assistant to the user. The software and/or logic may exist in shared resources of the system 120 (e.g., memory and/or processors), or in distinct dedicated resources. The CPSs 180 may receive calls and/or other data from the orchestrator component 230 (described further below) and return responses to the orchestrator component 230. The CPSs 180 may also store and retrieve data to/from the assistant metadata component 155, such as settings specific to a CPSs 180 and/or to particular users of the CPSs 180. Data provided by the assistant metadata component 155 may be used by the CPSs 180 to project a "personality" in the form of an identifiable voice and/or visual themes. The CPSs 180 may each operate in conjunction with the skill components 190 and/or 191. In some operations, for example, a user may invoke the first CPS 180a for handling a command associated with a skill component 191 corresponding to the second CPS 180b. In some cases, the replanner component 150 may prescribe operations to effect a handoff of the command from the first CPS 180a to the second CPS 180b.

The replanner component 150 may be configured to determine when a requested CPS 180 differs from assistant selected CPS 180 for handling the command, and take action. For example, if a user utters a command, "Alexa, roll up the windows," an NLU component and/or a post-NLU ranker may determine that Alexa may not be the best assistant for activating features of a vehicle 110e, and that Hal may be a more appropriate assistant. Thus the NLU component and/or the post-NLU ranker may return skill and intent data, and further indicate a requested CPS 180a (in this case, corresponding to Alexa) and assistant selected CPS 180b (in this case, corresponding to Hal). The replanner component 150 may receive the NLU result data and based on the mismatch between requested and acting CPSs, generate plan data that the system 120 can parse to, for example, generate outputs indicating the handover execution of the user command from Alexa to Hal, and to further cause execution in response to the command by the device 110 and/or one of the skill components 190. Using the plan, the speech-processing system can provide the user with an indication of the handover followed by a response and/or an execution of the command, with each visual, verbal, and/or non-verbal output delivered in the style of the appropriate CPS 180 and timed to provide the user with an intuitive indication of the which assistant is handling the command. In some implementations, the replanner component 150 may be implemented as a skill component 190 or a skill system 125.

The assistant metadata component 155 may be a memory or storage configured to store information related to CPSs 180 provided by the system 120. The assistant metadata component 155 can store information about which CPS[s] 180 is/are available for a given user, device 110, location, etc. The assistant metadata component 155 may store settings for CPSs 180 including which CPSs 180 are enabled for a particular user and/or device. The assistant metadata component 155 may store wake command (e.g., wakeword and/or gesture) information associated with assistant CPS 180 for a given user and/or device 110. In some embodiments, the assistant metadata component 155 may mirror the information stored in the local settings of the device 110. The assistant metadata component 155 may store ASR, NLU, and/or entity libraries associated with each assistant for use by the system 120 during language processing. The assistant metadata component 155 may also store speech style information for each CPS 180 for use by a TTS component of the system 120 for providing verbal output in a style recognizable by a user as a personality indicating the identity of the assistant. The assistant metadata component 155 may store information regarding non-verbal indications of the CPS 180, such as colors, earcons, voice chromes, etc. indicative of the identity of an assistant. The assistant metadata component 155 may include one or more templates describing a syntax for plan data for different handoff types. Each handoff type may be associated with a template. The replanner component may 150 use a template to generate plan data according to a selected handoff type. Rules for choosing a handoff type and templates for generating corresponding plan data may also be provided by the assistant metadata component 155. The replanner component 150 may determine a handoff type to use based on parameters of the first plan data and/or other context. The replanner component 150 may retrieve a template for the determined handoff type from the assistant metadata component 155 and use the template to generate the plan data. The template may specify one or more sections (e.g., data fields) to be included in the plan, where each section corresponds to an operation to be performed by the system. The template may specify a format of the sections. For example, the template may describe an operation according to a handoff pre-roll; that is, a message informing a user that a CPS 180 other than the requested CPS 180 will handle the user's command. The template may describe that the pre-roll data field include an instruction to launch the replanner component 150 with a payload reflecting a setting of the first CPS 180 for the purpose of generating a verbal message to the user using TTS settings associated with the first CPS180. Similarly, the template may describe a post-roll data field that may be used for a barge-in handoff type. The post-roll data field may include an instruction to launch the replanner component 150 to generate a verbal message in a second speech style associated with the second CPS 180. The template may describe a command execution section that may include an instruction to call a skill or skill system based on a setting associated with the second CPS 180. The template may describe additional operations for other handoff types, including updating visual themes presented by the device for indicating visually which CPS 180 is active at a given moment. The template may specify an order of the operations as reflected by the order of sections in the plan data. The replanner component 150 may use a template from the assistant metadata component 155 corresponding to the determined handoff type to generate plan data.

FIG. 1B is a conceptual diagram illustrating the interaction of the components of the virtual assistant system 100, according to embodiments of the present disclosure. The system 100 includes the device 110 and the system 120. The device 110 includes the microphone 114, speaker 112, primary wakeword detector 121, secondary wakeword detector 122, multi-assistant component 115, first assistant component 140a, and second assistant component 140b. The system 120 includes a first CPS 180a associated with skill components 190, and a second CPS 180b associated with skill components 191. The system 120 includes a language processing component 192 and a language output component 193. The language processing component 192 may receive input audio data from the assistant-specific components 140, and send NLU results data to the CPSs 180. The CPSs 180 may respond to commands represented by the NLU results data with the assistance of the skill components 190. The language output component 193 may receive response data from the CPS 180 and/or the skills components 190. The language output component 193 may generate natural language responses based on the response data, and return the natural language responses to the assistant-specific components 140.

Figure 5:
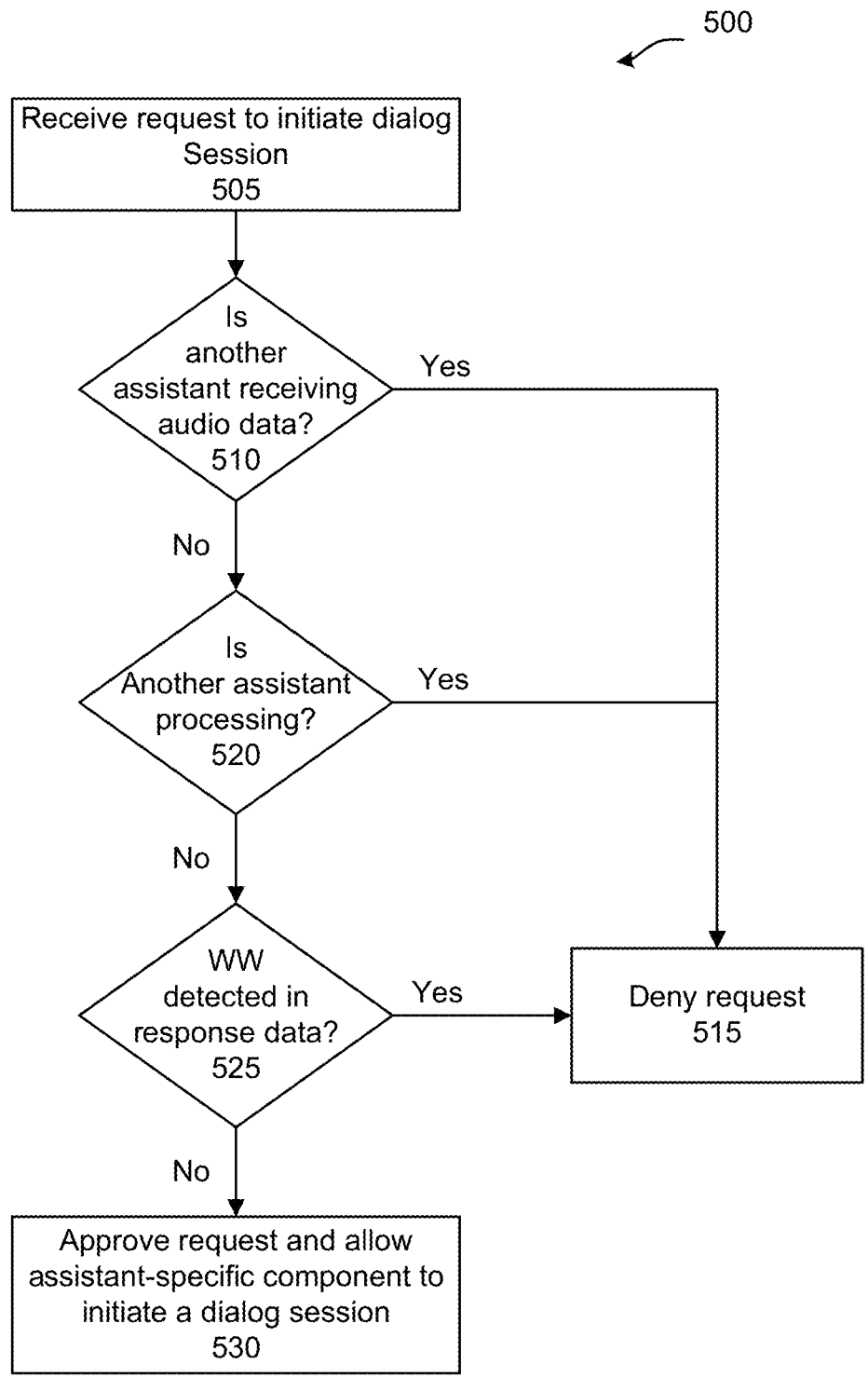
FIG. 5 is a flowchart illustrating example operations for approving or denying a request to initiate a dialog session, according to embodiments of the present disclosure.

The microphone 114 may receive audio, and the primary wakeword detector 121 may detect a wakeword in the audio, such as a first wakeword associated with the first CPS 180a (e.g., detected by primary wakeword detector 121a) and/or a second wakeword associated with the second CPS 180b (e.g., detected by primary wakeword detector 121b). An assistant-specific component 140, upon receiving a notification that the primary wakeword detector 121 has detected its wakeword, may receive the input audio data and forward it to the system 120 for processing by the CPS 180 associated with the assistant-specific component 140. In some implementations, the assistant-specific component 140 may send a request to the multi-assistant component 115 to initiate a dialog session between the device 110 and the CPS 180. The multi-assistant component 115 may control when and/or how the assistant-specific components 140 may send data to the CPSs 180. This control may, for example, prevent the CPSs 180 from observing each other's activities and/or prevent one CPS 180 from interrupting a dialog involving another CPS 180. FIG. 5 illustrates example operations 500 of a multi-assistant component 115 determining whether to approve or deny a request to initiate a dialog session. If the multi-assistant component 115 approves the dialog session, the assistant-specific component 140 may send data to the system 120 for processing by the CPS 180.

The system 120 may return response data to the assistant-specific component 140. The response data may represent a natural language response. The secondary wakeword detector 122 may monitor some or all of the response data and identify one or more wakewords present in the data. If the secondary wakeword detector 122 detects a wakeword, it may send a notification to the multi-assistant component 115. The multi-assistant component 115 may, in response and for a limited time, prevent a wakeword received by the microphone 114 from activating a CPS 180. The assistant-specific component 140 may output the natural language response via the speaker 112.

In some cases, the microphone 114 may receive some or all of the audio output by the speaker 112. The primary wakeword detector 121 may detect a wakeword in the input audio data. To prevent self-wake or cross-wake, the multi-assistant component 115 may prevent activation of a CPS due to a detected wakeword by various mechanisms. In some implementations, the multi-assistant component 115, having been notified that the wakeword was detected in the response data, may instruct the primary wakeword detector 121 and/or the assistant-specific component 140 associated with that wakeword to ignore the input audio data and/or any detection of that wakeword for a period of time. If the response data includes timing information, for example, in the form of speech synthesis markup language (SSML), the multi-assistant component may instruct the primary wakeword detector 121 and/or the assistant-specific component 140 to ignore the input audio data and/or a wakeword detection occurring a time interval corresponding to a time when the speaker 112 is expected to output the wakeword. In some implementations, the multi-assistant component 115 may prevent the assistant-specific component 140 from receiving the input audio data, or instruct the assistant-specific component 140 not to send audio data to the system 120. In some implementations, the multi-assistant component 115 may deny a request by an assistant-specific component 140 to initiate a dialog session, thus preventing the assistant-specific component 140 from sending the input audio data to the system 120. Example operations of the system 100 are described in additional detail below with reference to FIG. 4 and FIG. 6.

The system 100 may operate using various components as described in FIG. 2A. FIG. 2A illustrates various components of the system 120 described with references to FIG. 1A as well as additional components. The various components may be located on same or different physical devices. system For example, in some implementations, components of the system 120 may reside in the device 110 or be shared between the device 110 and the system 120 as described below with reference to FIG. 3.

As shown in FIG. 2A, the system 100 may include multiple speech-processing systems 120a, 120b, and 120c. A speech-processing system 120 may perform operations related to a virtual assistant. A system 120 may include one or more skill components 190a, 190b, and 190c corresponding to the assistant. A skill component 190 may communicate with a skill support system 125. Communication between various components may occur directly or across a network(s) 199 connecting one or more of the devices 110, systems 120, and/or skill support systems 125. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 121. The wakeword detection component 121 may be configured to detect various wakewords. In at least some examples, each wakeword may correspond to a name of a different digital assistant corresponding to a different system 120. An example wakeword/digital assistant name is "Alexa." In another example, input to the system may be in form of text data 213, for example as a result of a user typing an input into a user interface of device 110. Other input forms may include indication that the user has pressed a physical or virtual button on device 110, the user has made a gesture, etc. The device 110 may also capture images using camera(s) 1118 of the device 110 and may send image data 221 representing those image(s) to the system 120. The image data 221 may include raw image data or image data processed by the device 110 before sending to the system 120.

The wakeword detector 121 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 121 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMIVIs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 121 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used. Although it may operate on audio data intended for output by the device 110, the secondary wakeword detector 122 may detect a representation of a wakeword in such output audio data using similar techniques to those used by the primary wakeword detector 121.

Once the wakeword is detected by the wakeword detector 121 and/or input is detected by an input detector, the device 110 may "wake" and begin transmitting audio data 111, representing the audio 11, to the system(s) 120. The audio data 111 may include data corresponding to the wakeword; in other embodiments, the portion of the audio corresponding to the wakeword is removed by the device 110 prior to sending the audio data 111 to the system(s) 120. In the case of touch input detection or gesture based input detection, the audio data may not include a wakeword.

An input detector of the device 110 may detect user input such as a gesture (e.g., a button press or touch-screen touch). An example button is a "Push to Talk" button. The device 110 may send the audio data 111 captured after gesture detection to the system(s) 120. The button and/or the input detector may be capable of differentiating gestures such as tap-to-talk, push-and-hold, double-click, etc. In any event, the device 110 sends the audio data 111 or data representing the received audio 11 and/or commands conveyed therein to the server 120.

In some implementations, the system 100 may include more than one system 120, each representing a virtual assistant having a different "personality" and abilities to provide different services and/or access to different skills. Each system 120 may be invoked by a different wakeword and/or gesture. The system 100 may have a separate wakeword and system for different skills/systems (e.g., "Dungeon Master" for a game play skill component 190 associated with a first system 120a) and/or such skills/systems may be coordinated by one or more skill component(s) 190 of one or more systems 120.

Upon receipt by the system(s) 120, the audio data 111 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 111 to a language processing component 192. The language processing component 192 (sometimes also referred to as a spoken language understanding (SLU) component) includes an automatic speech recognition (ASR) component 250 and a natural language understanding (NLU) component 260. The ASR component 250 may transcribe the audio data 111 into text data. The text data output by the ASR component 250 represents one or more than one (e.g., in the form of an N-best list) ASR hypotheses representing speech represented in the audio data 111. The ASR component 250 interprets the speech in the audio data 111 based on a similarity between the audio data 111 and pre-established language models. For example, the ASR component 250 may compare the audio data 111 with models for sounds (e.g., acoustic units such as phonemes, senons, phones, etc.) and sequences of sounds to identify words that match the sequence of sounds of the speech represented in the audio data 111. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein. The ASR component 250 is described in greater detail below with regard to FIG. 7.

The language processing component 192 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the system(s) 120, a skill component 190, a skill system(s) 125, etc.) to execute the intent. For example, if the text data corresponds to "play the $5^{th}$ Symphony by Beethoven," the NLU component 260 may determine an intent that the system output music and may identify "Beethoven" as an artist/composer and "5th Symphony" as the piece of music to be played. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110. However, if the NLU component 260 is unable to resolve the entity—for example, because the entity is referred to by anaphora such as "this song" or "my next appointment"—the language processing component 192 can send a decode request to another language processing component 192 for information regarding the entity mention and/or other context related to the utterance. The language processing component 192 may augment, correct, or base results data upon the audio data 111 as well as any data received from the other language processing component 192.

In some implementations, the NLU component 260 and/or the ASR component 250 may leverage models, grammars, lexicons, and/or other libraries of data for use in processing natural language inputs. Performance of the system 100 may be improved through use of libraries specific to the virtual assistants available via the system or currently enabled for a particular user/device 110 providing the natural language input. Upon receiving input data related to a natural language input, the system 120 may retrieve a list of enabled and/or available CPSs 180, e.g., from the profile storage 270 and/or the assistant metadata component 155, and process the natural language input based on libraries associated with the assistants present in the list(s).

The NLU component 260 may return NLU results data 985/925 (which may include tagged text data, indicators of intent, etc.) back to the orchestrator component 230. The orchestrator component 230 may forward the NLU results data to a skill component(s) 190. If the NLU results data includes a single NLU hypothesis representing a skill associated with the CPS 180 corresponding to the assistant invoked by the user command, the NLU component 260 and the orchestrator component 230 may direct the NLU results data to the skill component(s) 190 associated with the NLU hypothesis. If the NLU results data 985/925 includes an N-best list of NLU hypotheses, the NLU component 260 and the orchestrator component 230 may direct the top scoring NLU hypothesis to a skill component(s) 190 associated with the top scoring NLU hypothesis. The system may also include a post-NLU ranker 265 which may incorporate other information to rank potential interpretations determined by the NLU component 260. The local device 110 may also include its own post-NLU ranker 365, which may operate similarly to the post-NLU ranker 265. The NLU component 260, post-NLU ranker 265 and other components are described in greater detail below with regard to FIG. 9.

A skill component 190 may be software running on the system(s) 120 that is akin to a software application. That is, a skill component 190 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 190. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 190 may operate in conjunction between the system(s) 120 and other devices, such as the device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 290.

A skill support system(s) 125 and/or 126 may communicate with a skill component(s) 190 within the system(s) 120 and/or directly with the orchestrator component 230 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 190 dedicated to interacting with the skill support system(s) 125. Unless expressly stated otherwise, reference to a skill, skill device, or skill component may include a skill component 190 operated by the system(s) 120 and/or skill operated by the skill support system(s) 125. Moreover, the functionality described herein as a skill or skill may be referred to using many different terms, such as an action, bot, app, or the like. The skill 190 and or skill support system(s) 125 may return output data to the orchestrator component 230.

The system 120 includes a language output component 193. The language output component 193 includes a natural language generation (NLG) component 279 and a text-to-speech (TTS) component 280. The NLG component 279 can generate text for purposes of TTS output to a user. For example the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280 (e.g., output text data 1010 discussed below). Alternatively or in addition, the TTS component 280 may receive text data from a skill component 190 or other system component for output.

The NLG component 279 may include a trained model. The NLG component 279 generates text data 1010 from dialog data such that the output text data 1010 has a natural feel and, in some embodiments, includes words and/or phrases specifically formatted for a requesting individual. The NLG may use templates to formulate responses. And/or the NLG system may include models trained from the various templates for forming the output text data 1010. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 190, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder. The TTS component 280 is described in additional detail below with reference to FIG. 10.

In some cases, the system 100 may provide access to multiple assistants via the systems 120. Each assistant may have its own personality as reflected in particular speech style. The language output component 193 may therefore provide different synthesized speech depending on the corresponding CPS 180. The language output component 193 may receive assistant metadata from the orchestrator component 230, skill component 190, and/or the replanner component 150, etc. The language output component 193 may retrieve speech style data for the system 120 corresponding to the active assistant from the assistant metadata component 155. The language output component 193 may use the speech style data to generate synthesized speech matching the personality of the active assistant.

The system 100 (either on device 110, system 120, or a combination thereof) may include profile storage 270 for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier/user profile identifier. Each user profile may include various user identifying data. Each user profile may also include data corresponding to preferences of the user. For example, each user profile may include a list of assistants enabled for the user with respect to a given device. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith.

That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 2B:
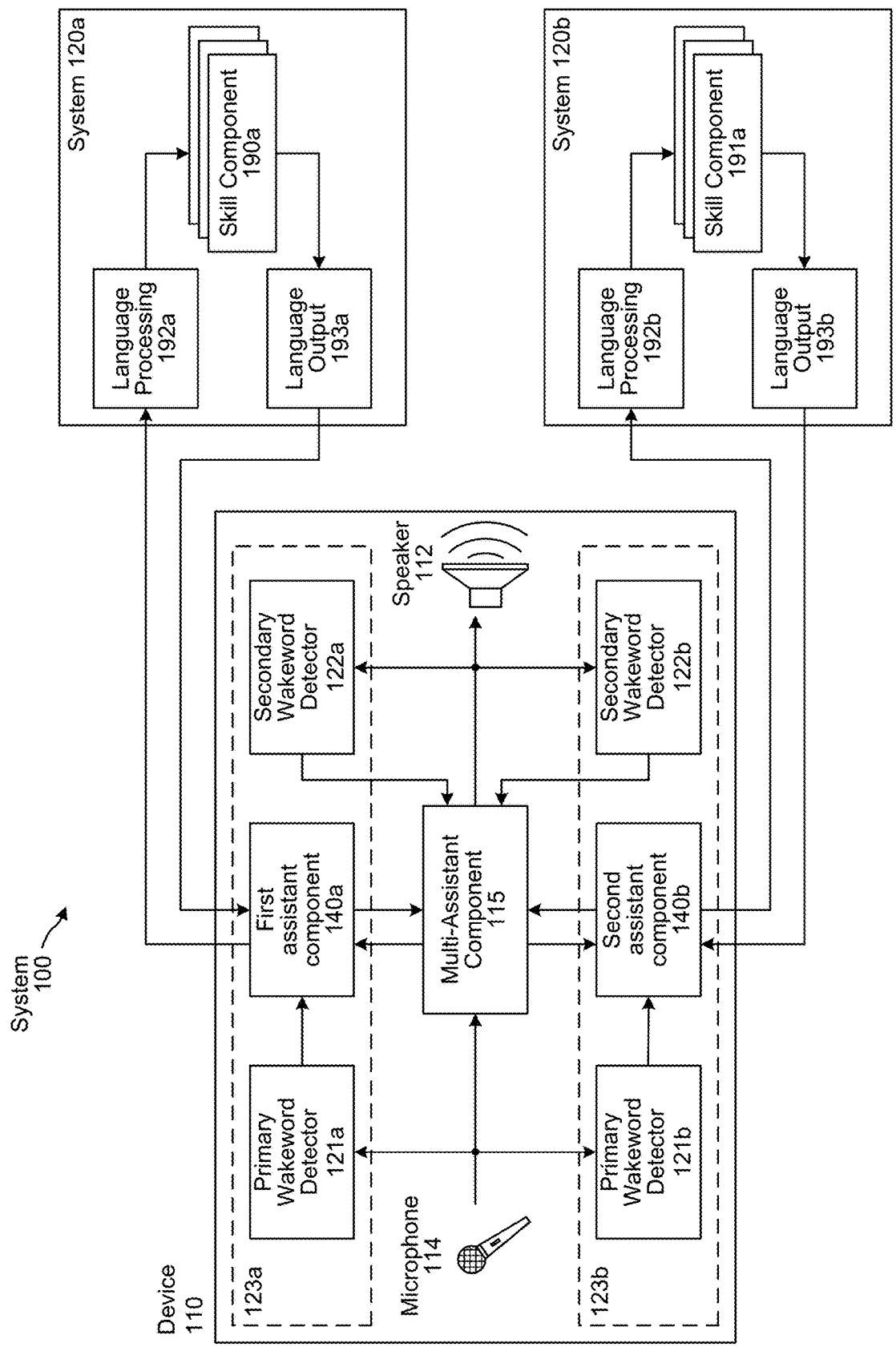
FIG. 2B is a conceptual diagram illustrating the interaction of the components of the virtual assistant system, according to embodiments of the present disclosure.

FIG. 2B is a conceptual diagram illustrating the interaction of the components of the virtual assistant system, according to embodiments of the present disclosure. The system 100 includes the device 110 and one or more system 120a, 120b, etc. (collectively "systems 120"). The device 110 includes the microphone 114, speaker 112, multi-assistant component 115, and wakeword management components 123a and 123b. The first wakeword management components 123a include a primary wakeword detector 121a, secondary wakeword detector 122a, and first assistant component 140a. The second wakeword management components 123b include a primary wakeword detector 121b, secondary wakeword detector 122b, and second assistant component 140b. The first wakeword management components 123a may correspond to the first system 120a and the second wakeword management components 123b may correspond to the second system 120b. The system 120a may correspond to a first assistant and may include a language processing component 192a, a language output component 193a, and skill components 190a, 190b, 190c, etc. The system 120b may correspond to a second assistant and may include a language processing component 192b, a language output component 193b, and skill components 191a, 191b, 191c, etc. A speech-processing system 120 may perform operations related to a virtual assistant. In the system 100 shown in FIG. 2B, system 120a and system 120b may operate independently with little or no visibility into the other's operations and/or state. Communication between the systems 120 and the device 110 occurs using respective assistant-specific components 140. The multi-assistant component 115 may control when and/or how an assistant-specific component 140 may communicate data to its corresponding system 120.

The language processing components 192a and 192b may function as the language processing components 192 previously described. In an example operation, the language processing component 192a may receive input audio data from the first assistant component 140a, and send NLU results data to one or more of the skill components 190. The skill component 190 may generate a response to one or more commands represented by the NLU results data. The skill component 190 may send response data to the language output component 193a.

The language output components 193a and 193b may function as the language output components 193 previously described. The language output component 193a may receive response data from the skill components 190. The language output component 193a may generate a natural language response based on the response data, and return the natural language responses to the first assistant component 140a. The system 120b may function similarly with respect to data received from the second assistant component 140b.

In an example operation, the microphone 114 may receive audio, and the first primary wakeword detector 121a may detect a wakeword in the audio, such as a first wakeword associated with the first system 120a. The first assistant component 140af, upon receiving a notification that the first primary wakeword detector 121a has detected its wakeword, may receive the input audio data via the multi-assistant component 115 and forward it to the first system 120a for processing by a skill component 190firs. In some implementations, the first assistant component 140a may send a request to the multi-assistant component 115 to initiate a dialog session between the device 110 and the system 120. The multi-assistant component 115 may control when and/or how the assistant-specific components 140 may send data to the systems 120. This control may, for example, prevent the systems 120 from observing each other's activities and/or prevent one system 120 from interrupting a dialog involving another system 120. FIG. 5 illustrates example operations 500 of a multi-assistant component 115 determining whether to approve or deny a request to initiate a dialog session. If the multi-assistant component 115 approves the dialog session, the assistant-specific component 140 may send data to the system 120.

The system 120 may return response data to the first assistant component 140a. The response data may represent a natural language response. The secondary wakeword detectors 122a and/or 122b may monitor some or all of the response data and identify one or more wakewords present in the data. If, for example, the secondary wakeword detector 122b detects a wakeword, it may send a notification to the multi-assistant component 115 and/or the second assistant component 140b. The multi-assistant component 115 may, in response and for a limited time, prevent a wakeword received by the microphone 114 from activating the corresponding system 120b. The assistant-specific component 140 may output the natural language response via the speaker 112.

In some cases, the microphone 114 may receive some or all of the audio output by the speaker 112. One or more of the primary wakeword detectors 121a and/or 121b may detect a wakeword in the input audio data. To prevent self-wake or cross-wake, the multi-assistant component 115 may prevent activation of a system 120 due to a detected wakeword by various mechanisms. In some implementations, the multi-assistant component 115, having been notified that, for example, a wakeword associated with the second wakeword management components 123b and or system 120b was detected in the response data, may instruct the second primary wakeword detector 121b and/or the second assistant component 140b to ignore the input audio data and/or any detection of that wakeword for a period of time. If the response data includes timing information, for example, in the form of SSML, the multi-assistant component may instruct the second primary wakeword detector 121b and/or the second assistant component 140b to ignore the input audio data and/or a wakeword detection occurring a time interval corresponding to a time when the speaker 112 is expected to output the wakeword. In some implementations, the multi-assistant component 115 may prevent the second assistant component 140b from receiving the input audio data, or instruct the second assistant component 140b not to send audio data to the system 120. In some implementations, the multi-assistant component 115 may deny a request by the second assistant component 140b to initiate a dialog session, thus preventing the second assistant component 140b from sending the input audio data to the system 120b. Example operations of the system 100 are described in additional detail below with reference to FIG. 4 and FIG. 6.

Although the components of FIGS. 2A and 2B may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 3 illustrates such a configured device 110.

In at least some embodiments, the system 120 may receive the audio data 111 from the device 110, to recognize speech corresponding to a spoken input in the received audio data 111, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 280) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2A, the device 110 may include wakeword management components 123a and 123b. Each of the wakeword management components may include a wakeword detection component 121a or 121b configured to compare the audio data 111 to stored models used to detect a wakeword (e.g., "Alexa") that indicates to the device 110 that the audio data 111 is to be processed for determining NLU output data (e.g., slot data that corresponds to a named entity, label data, and/or intent data, etc.). In at least some embodiments, a hybrid selector 324, of the device 110, may send the audio data 111 to the wakeword detection component 121. If the wakeword detection component 121 detects a wakeword in the audio data 111, the wakeword detection component 121 may send an indication of such detection to the hybrid selector 324. In response to receiving the indication, the hybrid selector 324 may send the audio data 111 to the system 120 and/or the ASR component 350. The wakeword detection component 121 may also send an indication, to the hybrid selector 324, representing a wakeword was not detected. In response to receiving such an indication, the hybrid selector 324 may refrain from sending the audio data 111 to the system 120, and may prevent the ASR component 350 from further processing the audio data 111. In this situation, the audio data 111 can be discarded.

The device 110 may conduct its own speech processing using on-device language processing components, such as an SLU/language processing component 392 (which may include an ASR component 350 and an NLU 360), similar to the manner discussed herein with respect to the language processing component 192 (or ASR component 250 and the NLU component 260) of the system 120. Language processing component 392 may operate similarly to language processing component 192, ASR component 350 may operate similarly to ASR component 250 and NLU component 360 may operate similarly to NLU component 260. The device 110 may also internally include, or otherwise have access to, other components such as one or more skill components 390 capable of executing commands based on NLU output data or other results determined by the device 110/system 120 (which may operate similarly to skill components 290), profile storage 370 (configured to store similar profile data to that discussed herein with respect to the profile storage 270 of the system 120), or other components. In at least some embodiments, the profile storage 370 may only store profile data for a user or group of users specifically associated with the device 110. Similar to as described above with respect to skill component 190, a skill component 390 and/or 391 may communicate with a skill system(s) 125 and/or 126, respectively. The device 110 may also have its own language output component 393 which may include NLG component 379 and TTS component 380. Language output component 393 may operate similarly to language output component 193, NLG component 379 may operate similarly to NLG component 279 and TTS component 380 may operate similarly to TTS component 280.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 111 to pass to the system 120 while also receiving (e.g., intercepting) this audio data 111 and sending the audio data 111 to the HEC 327.

In at least some embodiments, the hybrid selector 324 may further include a local request orchestrator (LRO) 328 configured to notify the ASR component 350 about the availability of new audio data 111 that represents user speech, and to otherwise initiate the operations of local language processing when new audio data 111 becomes available. In general, the hybrid selector 324 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 111 is received, the HP 326 may allow the audio data 111 to pass through to the system 120 and the HP 326 may also input the audio data 111 to the on-device ASR component 350 by routing the audio data 111 through the HEC 327 of the hybrid selector 324, whereby the LRO 328 notifies the ASR component 350 of the audio data 111. At this point, the hybrid selector 324 may wait for response data from either or both of the system 120 or the local language processing components. However, the disclosure is not limited thereto, and in some examples the hybrid selector 324 may send the audio data 111 only to the local ASR component 350 without departing from the disclosure. For example, the device 110 may process the audio data 111 locally without sending the audio data 111 to the system 120.

The local ASR component 350 is configured to receive the audio data 111 from the hybrid selector 324, and to recognize speech in the audio data 111, and the local NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 111 to the system 120, and the response data from the system 120 may include the unique identifier to identify which natural language user input the response data corresponds.

In at least some embodiments, the device 110 may include, or be configured to use, one or more skill components 390 that may work similarly to the skill component(s) 190 implemented by the system 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 390, a skill system 125, or a combination of a skill component 390 and a corresponding skill system 125.

Similar to the manner discussed with regard to FIG. 2A, the local device 110 may be configured to recognize multiple different wakewords and/or perform different categories of tasks depending on the wakeword. Such different wakewords may invoke different processing components of local device 110 (not illustrated in FIG. 3). For example, detection of the wakeword "Alexa" by the wakeword detector 121 may result in sending audio data to certain language processing components 392/skill components 390 for processing while detection of the wakeword "Computer" by the wakeword detector 121 may result in sending audio data different language processing components 392/skill components 390 for processing.

Figure 4:
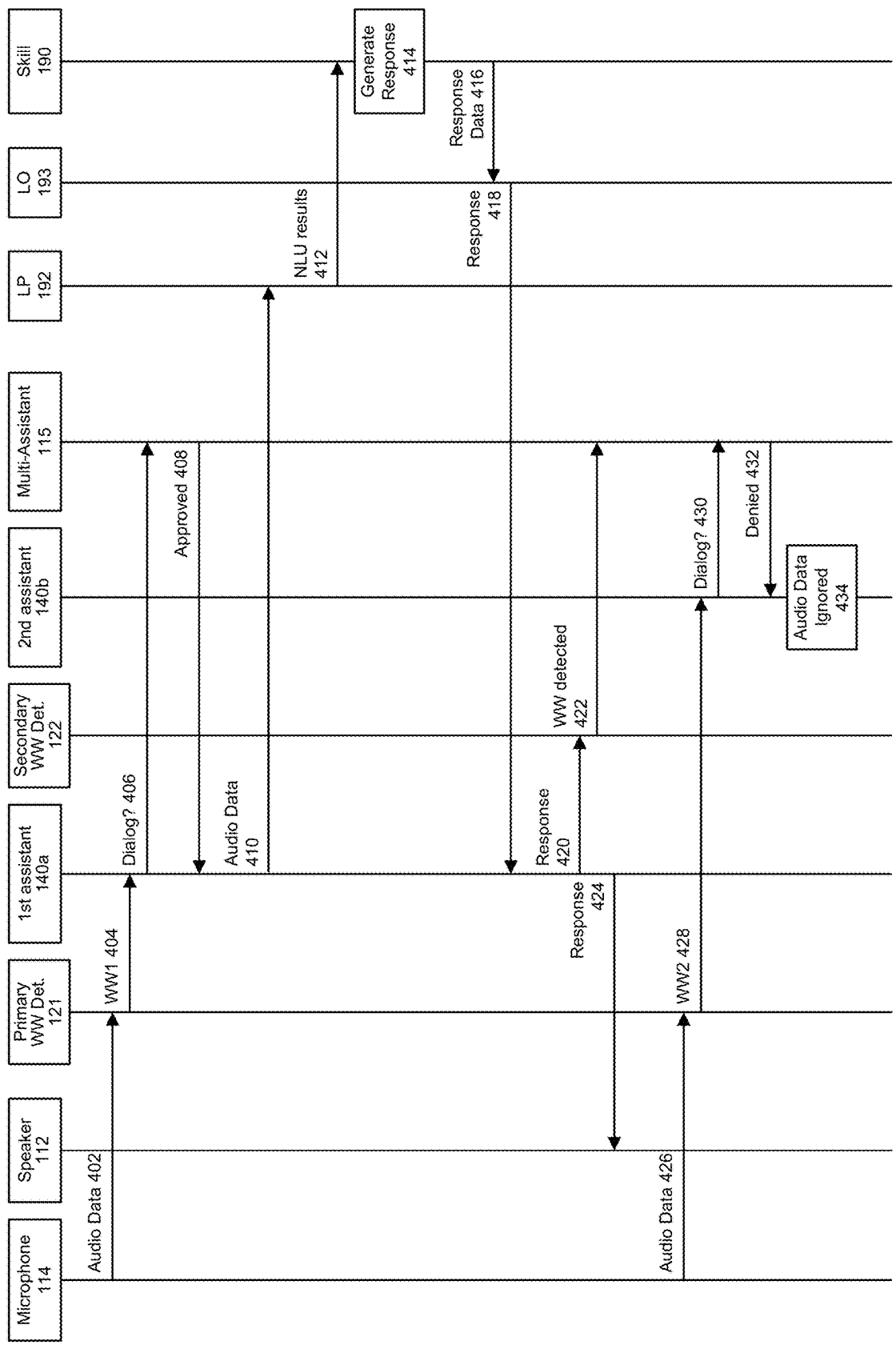
FIG. 4 is a signal flow diagram illustrating example operations for preventing a cross-wake in a virtual assistant system by denying a request to initiate a dialog session, according to embodiments of the present disclosure.

FIG. 4 is a signal flow diagram illustrating example operations for preventing a cross-wake in a virtual assistant system by denying a request to initiate a dialog session, according to embodiments of the present disclosure. FIG. 4 describes operations between the microphone 114, primary wakeword detector 121, first assistant component 140a, multi-assistant component 115, language processing component (LP) 192, skill component 190, language output component (LO) 193, secondary wakeword detector 122, second assistant component 140b, and speaker 112. The first assistant component 140a may correspond to a first assistant and communicate with one or more speech processing components, such as the skill component 190. The skill 190 may be associated with a first command processing subsystem (CPS) 180a or a first speech-processing system 120a. The second assistant component 140b may correspond to a second assistant and communicate with one or more other speech processing components associated with a second CPS 180b or a second speech-processing system 120b.

The microphone 114 may receive audio and send (402) audio data to the primary wakeword detector 121. The primary wakeword detector 121 may detect a first wakeword associated with the first assistant and notify (404) the first assistant component 140a of the detection. The first assistant component 140a may send (406) a request to the multi-assistant component 115 to initiate a dialog session between the device 110 and the first system 120a (or the first CPS 180a) corresponding to the first assistant. The multi-assistant component 115 may return (408) an approval. In response to the approval, the first assistant component 140a may send (410) the input audio data to the language processing component 192 for processing. The language processing component 192 may send (412) NLU results data to the speech processing component corresponding to the first wakeword; e.g., the skill component 190. The skill component 190 may generate (414) response data, which it may send (416) to the language output component 193. The language output component 193 may generate a response, which may be a natural language response, and return (418) the response to the first assistant component 140a. The first assistant component 140a may send (420) the response to the secondary wakeword detector 122. The secondary wakeword detector 122 may detect a second wakeword associated with a second assistant, and may notify (422) the multi-assistant component 115. In response, the multi-assistant component 115 may determine to prevent first output audio representing the response from being processed by a second speech processing component corresponding to the second wakeword. For example, the multi-assistant component 115 may configure a setting to prevent a subsequent detection of that wakeword from activating the second system 120b or the second CPS 180b corresponding to the second assistant. The first assistant component 140a may send (424) response to the speaker 112 for output; for example, as synthetic speech.

The microphone 114 may detect audio corresponding to the synthetic speech output by the speaker 112. The primary wakeword detector 121 may receive (426) second input audio data and detect a second wakeword associated with the second assistant. The primary wakeword detector 121 may notify (428) the second assistant component 140b of the detection. The second assistant component 140b may send (430) a request to the multi-assistant component 115 to initiate a second dialog session between the device 110 and the second system 120b (or the second CPS 180b) corresponding to the second assistant. In this case, however, and based on the setting configured after the step 422, the multi-assistant component 115 may deny (432) the request. In response to the denial, the second assistant component 140b may ignore (434) the wakeword detection, and transmits no data to the second CPS 180b.

The system 100 may prevent self-wake in a manner similar to that described in FIG. 4, but by detecting the first wakeword in the response data received by the secondary wakeword detector 122 at the step 420.

FIG. 5 is a flowchart illustrating example operations 500 for approving or denying a request to initiate a dialog session, according to embodiments of the present disclosure.

The multi-assistant component 115 may receive (505) a request to initiate a dialog session. The multi-assistant component 115 may determine (510) whether a different CPS 180 and/or system 120 is receiving and/or processing input audio; e.g., that an assistant-specific component is sending input audio data to the other CPS 180 and/or system 120. The system 100 may prevent two different assistants from receiving the same input audio data so as to prevent the assistants from observing the operations and/or states of another. If the multi-assistant component 115 determines that another CPS 180 and/or system 120 is currently receiving input audio data (510:yes), the multi-assistant component 115 may deny (515) the request. If the multi-assistant component 115 determines that no other CPS 180 and/or system 120 is currently receiving input audio data (510:no), the multi-assistant component 115 may proceed to the next step.

In some implementations, the multi-assistant component 115 may determine (520) whether another assistant is currently processing a command. In some cases, the system 100 may prevent a second system 120b and/or a second CPS 180b from initiating a dialog with the device 110 before the system 120a and/or first CPS 180a has finished processing a received command. Allowing the second assistant to activate at this such a time may disrupt the desired operation of the device 110 and result in a poor user experience. If the multi-assistant component 115 determines that another system 120 or CPS 180 is processing a command (520:yes), the multi-assistant component 115 may deny the request (515). If the multi-assistant component 115 determines that no other system 120 or CPS 180 is currently processing a command (520:no), the multi-assistant component 115 may proceed to the next step. In some cases, however, the system 100 may be configured to allow interruption of an assistant in a processing state. In such cases, the determination at the step 520 may be bypassed, or the multi-assistant component 115 may make an additional determination as to whether to deny a dialog request received when another system 120 or CPS 180 is processing.

The multi-assistant component 115 may determine (525) whether a wakeword corresponding to the requesting assistant-specific component 140 has been detected in previously output response data. If the multi-assistant component 115 determines that the wakeword has been recently detected in previously output response data (525:yes), the multi-assistant component 115 may deny the request (515). If the multi-assistant component 115 determines that the wakeword has not been recently detected (525:no), the multi-assistant component 115 may approve (530) and allow the assistant-specific component 140 to initiate the dialog.

Figure 6:
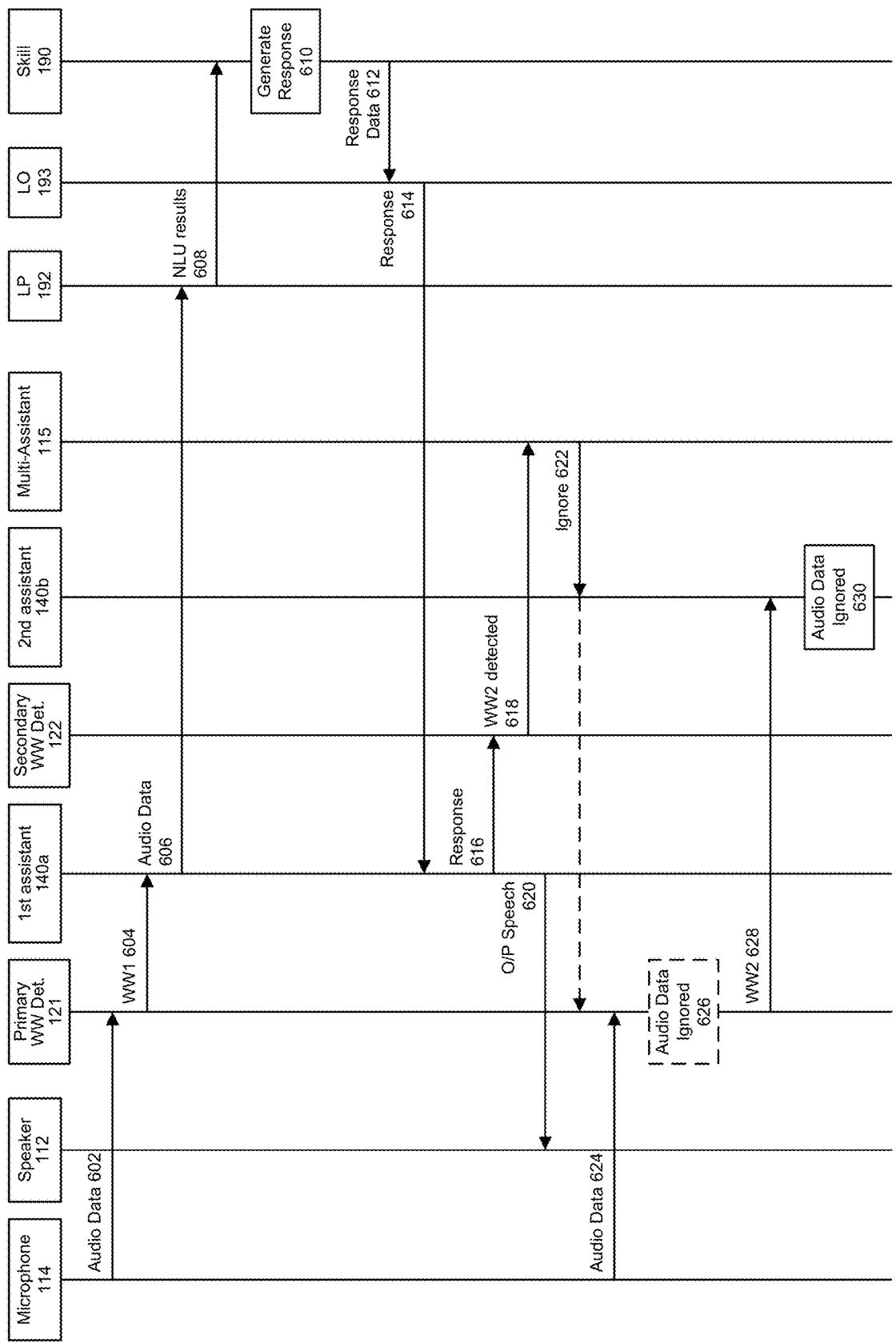
FIG. 6 is a signal flow diagram illustrating example operations for preventing a cross-wake in a virtual assistant system by ignoring wakewords in input audio data after they have been detected in response data, according to embodiments of the present disclosure.

FIG. 6 is a signal flow diagram illustrating example operations for preventing a cross-wake in a virtual assistant system by ignoring wakewords in input audio data after they have been detected in response data, according to embodiments of the present disclosure. FIG. 6 describes operations between the microphone 114, primary wakeword detector 121, first assistant component 140a, multi-assistant component 115, language processing component (LP) 192, skill component 190, language output component (LO) 193, secondary wakeword detector 122, second assistant component 140b, and speaker 112. The first assistant component 140a may correspond to a first assistant and communicate with one or more speech processing components, such as the skill component 190. The skill 190 may be associated with a first command processing subsystem (CPS) 180a or a first speech-processing system 120a. The second assistant component 140b may correspond to a second assistant and communicate with one or more other speech processing components associated with a second CPS 180b or a second speech-processing system 120b.

The microphone 114 may receive audio and send (602) audio data to the primary wakeword detector 121. The primary wakeword detector 121 may detect a first wakeword associated with the first assistant and may notify (604) the first assistant component 140a of the detection. The first assistant component 140a may send (606) the input audio data to the language processing component 192 for processing. The language processing component 192 may send (608) NLU results data to the speech processing component corresponding to the first wakeword; e.g., the skill component 190. The skill component 190may generate (610) response data, which it may send (612) to the language output component 193. The language output component 193 may generate a response, for example a natural language response, and may send (614) the response back to the first assistant component 140a. The first assistant component 140a may send (616) the response to the secondary wakeword detector 122. The secondary wakeword detector 122 may detect a second wakeword associated with the second assistant, and notify (618) the multi-assistant component 115. In response, the multi-assistant component 115 may determine to prevent first output audio representing the response from being processed by a second speech processing component corresponding to the second wakeword. For example, the multi-assistant component 115 may configure a setting to prevent a subsequent detection of that wakeword from activating the second CPS 180b, such as instructing (622) the second assistant component 140b and/or the primary wakeword detector 121 to ignore detection of the second wakeword for a period of time. The first assistant component 140a may send (620) response to the speaker 112 for output; for example, as synthetic speech.

The microphone 114 may detect audio corresponding to the synthetic speech output by the speaker 112. The primary wakeword detector 121 may receive (624) second input audio data and detect the second wakeword associated with the second assistant. The primary wakeword detector 121 may either ignore (626) the second wakeword, or notify (628) the second assistant component 140b of the detection. The second assistant component 140b may ignore (630) the wakeword detection, and transmit no data to the second speech processing component associated with the second wakeword and/or prevent the second speech processing component from generating a second response that is output by the device.

In some implementations, the system 100 may prevent self-wake in a manner similar to preventing cross-wake as described in FIG. 4 or FIG. 6. When preventing self-wake, the system 100 may, in step 422 and/or 616, detect the first wakeword in the response data received by the secondary wakeword detector 122, and subsequently prevent an interruption of the response by the first assistant.

Figure 7:
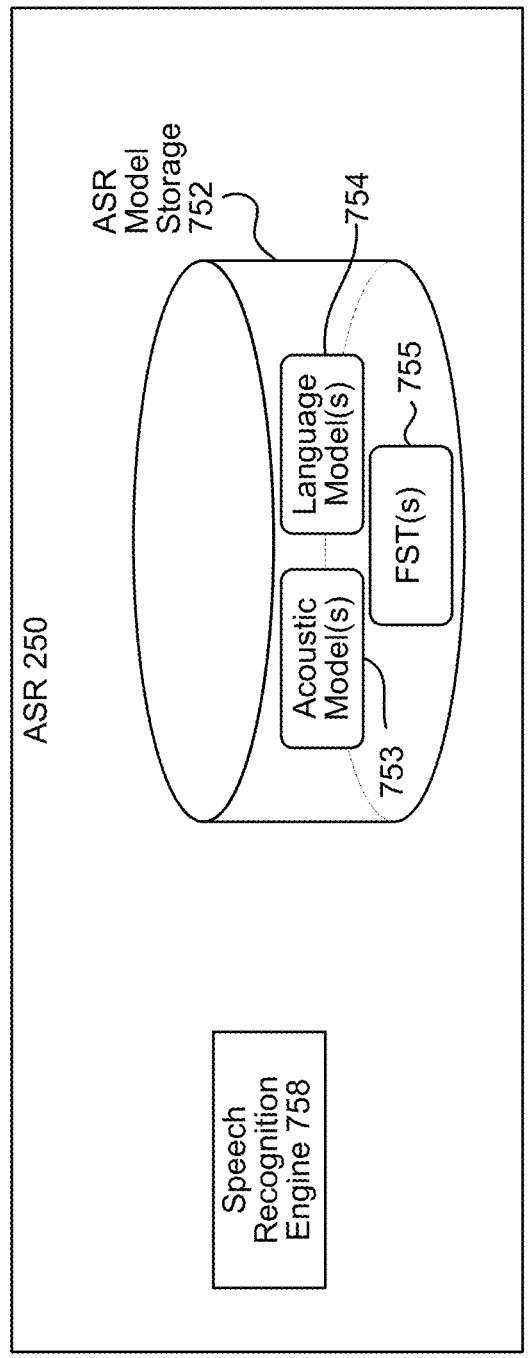
FIG. 7 is a conceptual diagram of an ASR component, according to embodiments of the present disclosure.

FIG. 7 is a conceptual diagram of an ASR component 250, according to embodiments of the present disclosure. The ASR component 250 may interpret a spoken natural language input based on the similarity between the spoken natural language input and pre-established language models 754 stored in an ASR model storage 752. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 755 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 753 stored in the ASR model storage 752), and the likelihood that a particular word, which matches the sounds, would be included in the sentence at the specific location (e.g., using a language or grammar model 754). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 758. The ASR component 250 receives audio data 111 (for example, received from a local device 110 having processed audio detected by a microphone by an acoustic front end (AFE) or other component). The speech recognition engine 758 compares the audio data 111 with acoustic models 753, language models 754, FST(s) 755, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the audio data 111 with reference to information stored in the ASR model storage 752. Feature vectors of the audio data 111 may arrive at the system 120 encoded, in which case they may be decoded prior to processing by the speech recognition engine 758.

The speech recognition engine 758 attempts to match received feature vectors to language acoustic units (e.g., phonemes) and words as known in the stored acoustic models 753, language models 2B54, and FST(s) 755. For example, audio data 111 may be processed by one or more acoustic model(s) 753 to determine acoustic unit data. The acoustic unit data may include indicators of acoustic units detected in the audio data 111 by the ASR component 250. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 754 (and/or using FST 755) to determine ASR data 910. The ASR data 910 can include one or more hypotheses. One or more of the hypotheses represented in the ASR data 910 may then be sent to further components (such as the NLU component 260) for further processing as discussed herein. The ASR data 910 may include representations of text of an utterance, such as words, subword units, or the like.

The speech recognition engine 758 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 758 may use the acoustic model(s) 753 to attempt to match received audio feature vectors to words or subword acoustic units. An acoustic unit may be a senone, phoneme, phoneme in context, syllable, part of a syllable, syllable in context, or any other such portion of a word. The speech recognition engine 758 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 758 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound.

Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 758, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 758 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 8:
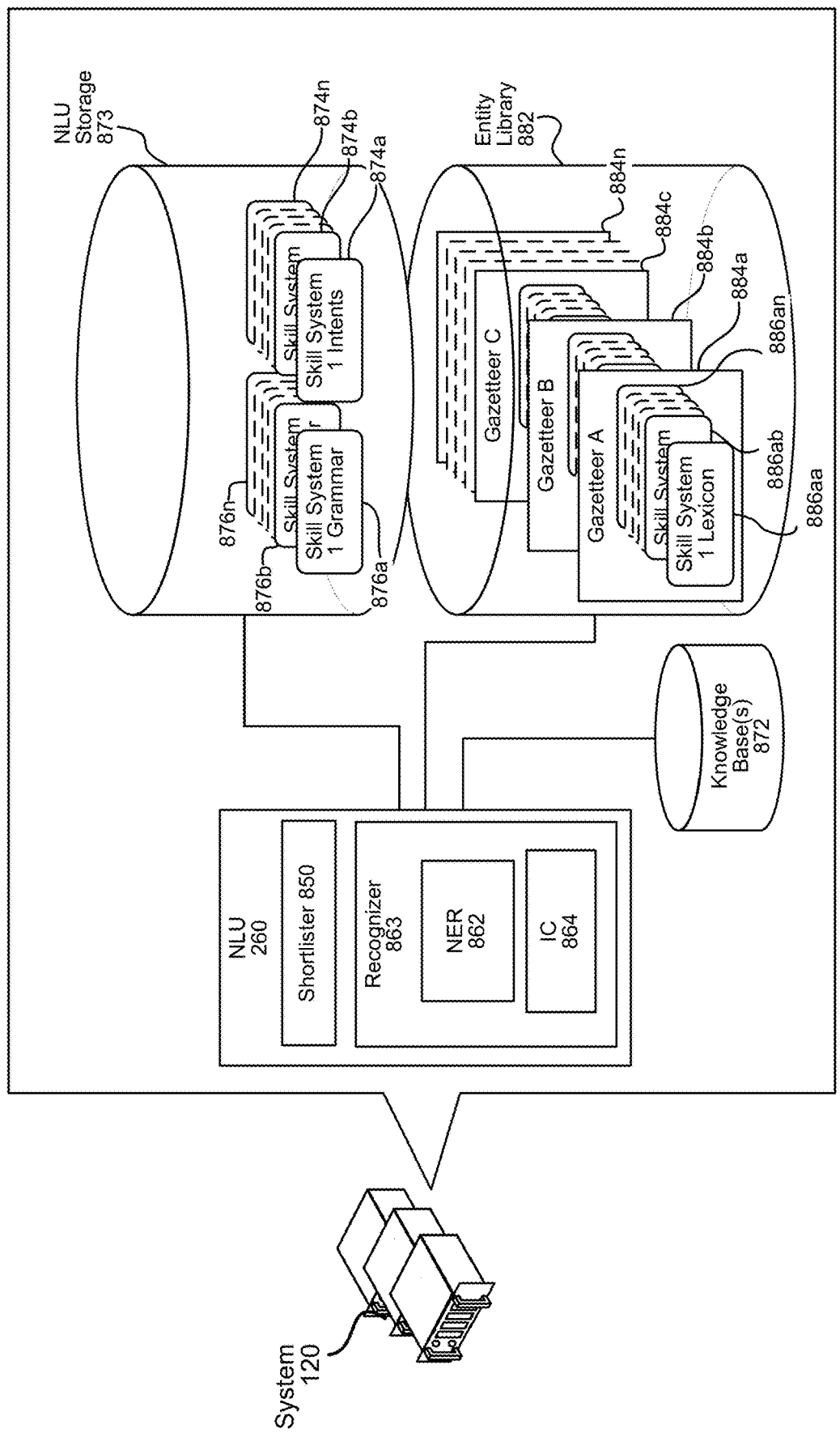
FIG. 8 is a conceptual diagram of how natural language processing is performed, according to embodiments of the present disclosure.
Figure 9:
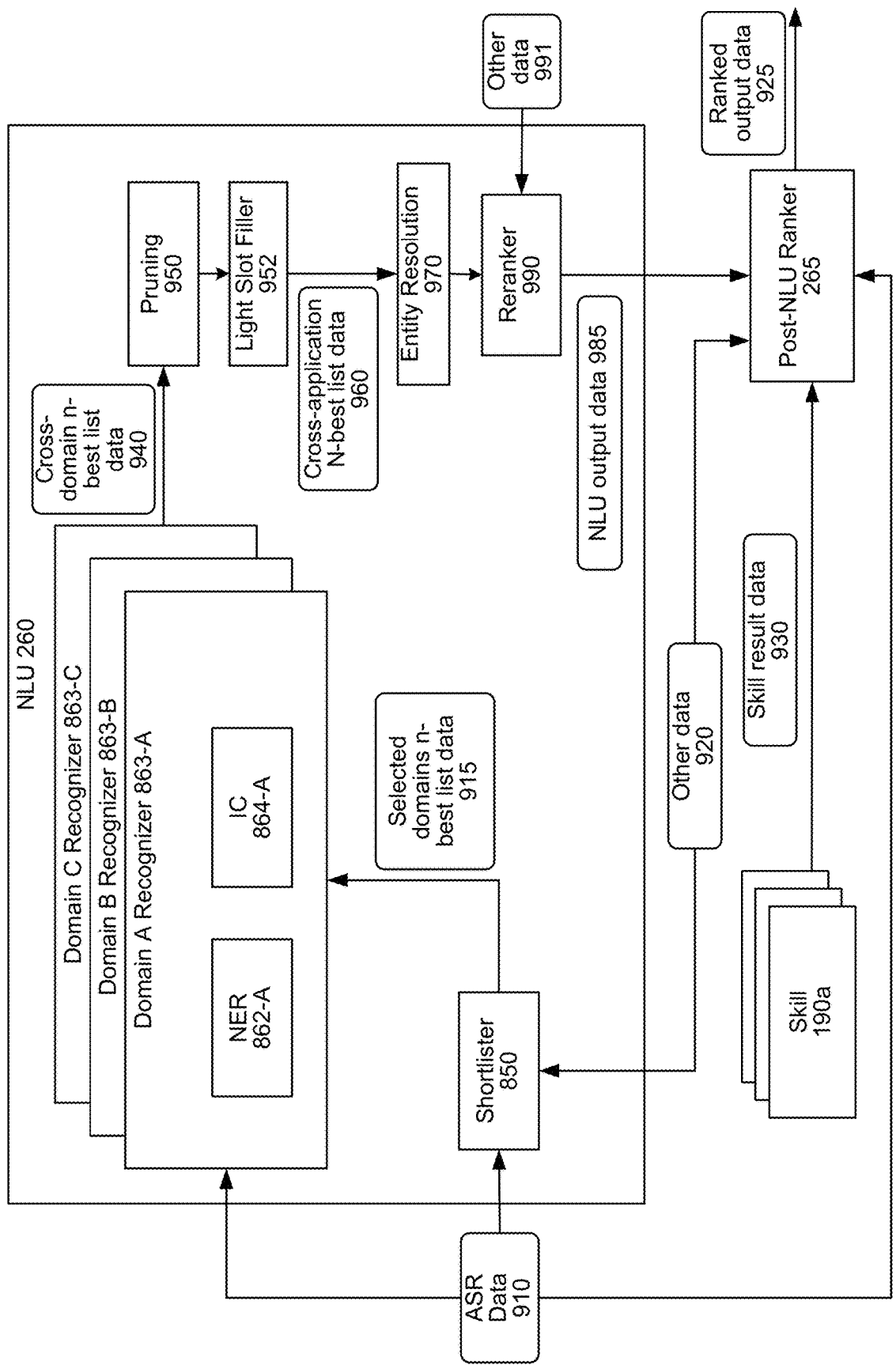
FIG. 9 is a conceptual diagram of how natural language processing is performed, according to embodiments of the present disclosure.

FIGS. 8 and 9 illustrates how the NLU component 260 may perform NLU processing. FIG. 8 is a conceptual diagram of how natural language processing is performed, according to embodiments of the present disclosure. And FIG. 9 is a conceptual diagram of how natural language processing is performed, according to embodiments of the present disclosure.

FIG. 8 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 850. The shortlister component 850 selects skills that may execute with respect to ASR output data 910 input to the NLU component 260 (e.g., applications that may execute with respect to the user input). The ASR output data 910 (which may also be referred to as ASR data 910) may include representations of text of an utterance, such as words, subword units, or the like. The shortlister component 850 thus limits downstream, more resource intensive NLU processes to being performed with respect to skills that may execute with respect to the user input.

Without a shortlister component 850, the NLU component 260 may process ASR output data 910 input thereto with respect to every skill of the system, either in parallel, in series, or using some combination thereof. By implementing a shortlister component 850, the NLU component 260 may process ASR output data 910 with respect to only the skills that may execute with respect to the user input. This reduces total compute power and latency attributed to NLU processing.

The shortlister component 850 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 850 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 850 may be trained with respect to a different skill. Alternatively, the shortlister component 850 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 850. For example, some sample user inputs may be positive examples (e.g., user inputs that may be used to invoke the skill). Other sample user inputs may be negative examples (e.g., user inputs that may not be used to invoke the skill).

As described above, the shortlister component 850 may include a different trained model for each skill of the system, a different trained model for each domain, or some other combination of trained model(s). For example, the shortlister component 850 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 850 to output indications of only a portion of the skills that the ASR output data 910 may relate to. For example, a user input may correspond to "tell me about Tom Collins." If the model is clustered based on domain, the shortlister component 850 may determine the user input corresponds to a recipe skill (e.g., a drink recipe) even though the user input may also correspond to an information skill (e.g., including information about a person named Tom Collins).

The NLU component 260 may include one or more recognizers 863. In at least some embodiments, a recognizer 863 may be associated with a skill system 125 (e.g., the recognizer may be configured to interpret text data to correspond to the skill system 125). In at least some other examples, a recognizer 863 may be associated with a domain such as smart home, video, music, weather, custom, etc. (e.g., the recognizer may be configured to interpret text data to correspond to the domain).

If the shortlister component 850 determines ASR output data 910 is potentially associated with multiple domains, the recognizers 863 associated with the domains may process the ASR output data 910, while recognizers 863 not indicated in the shortlister component 850's output may not process the ASR output data 910. The "shortlisted" recognizers 863 may process the ASR output data 910 in parallel, in series, partially in parallel, etc. For example, if ASR output data 910 potentially relates to both a communications domain and a music domain, a recognizer associated with the communications domain may process the ASR output data 910 in parallel, or partially in parallel, with a recognizer associated with the music domain processing the ASR output data 910.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU component 260) may also determine whether a word refers to an entity whose identity is not explicitly mentioned in the text data, for example "him," "her," "it" or other anaphora, exophora, or the like.

Each recognizer 863, and more specifically each NER component 862, may be associated with a particular grammar database 876, a particular set of intents/actions 874, and a particular personalized lexicon 886. Each gazetteer 884 may include domain/skill-indexed lexical information associated with a particular user and/or device 110. For example, a Gazetteer A (884*a*) includes skill-indexed lexical information 886*aa* to 886*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar database 876 includes the names of entities (i.e., nouns) commonly found in speech about the particular domain to which the grammar database 876 relates, whereas the lexical information 886 is personalized to the user and/or the device 110 from which the user input originated. For example, a grammar database 876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (884*a*-884*n*) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 863 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database 874 of words linked to intents. For example, a music intent database may link words and phrases such as "quiet," "volume off," and "mute" to a <Mute> intent. An IC component 864 identifies potential intents by comparing words and phrases in text data (representing at least a portion of the user input) to the words and phrases in an intents database 874 (associated with the domain that is associated with the recognizer 863 implementing the IC component 864).

The intents identifiable by a specific IC component 864 are linked to domain-specific (i.e., the domain associated with the recognizer 863 implementing the IC component 864) grammar frameworks 876 with "slots" to be filled. Each slot of a grammar framework 876 corresponds to a portion of text data that the system believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like. For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic> intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent}<PlayMusic>, {artist name} rolling stones, {media type} SONG, and {song title} mother's little helper. For further example, the NER component 862 may tag "play songs by the rolling stones" as: {domain} Music, {intent}<PlayMusic>, {artist name} rolling stones, and {media type} SONG.

The shortlister component 850 may receive ASR output data 910 output from the ASR component 250 or output from the device 110 (as illustrated in FIG. 9). The ASR component 250 may embed the ASR output data 910 into a form processable by a trained model(s) using sentence embedding techniques as known in the art. Sentence embedding results in the ASR output data 910 including text in a structure that enables the trained models of the shortlister component 950 to operate on the ASR output data 910. For example, an embedding of the ASR output data 910 may be a vector representation of the ASR output data 910.

The shortlister component 850 may make binary determinations (e.g., yes or no) regarding which domains relate to the ASR output data 910. The shortlister component 850 may make such determinations using the one or more trained models described herein above. If the shortlister component 850 implements a single trained model for each domain, the shortlister component 850 may simply run the models that are associated with enabled domains as indicated in a user profile associated with the device 110 and/or user that originated the user input.

The shortlister component 850 may generate n-best list data 915 representing domains that may execute with respect to the user input represented in the ASR output data 910. The size of the n-best list represented in the n-best list data 915 is configurable. In an example, the n-best list data 915 may indicate every domain of the system as well as contain an indication, for each domain, regarding whether the domain is likely capable to execute the user input represented in the ASR output data 910. In another example, instead of indicating every domain of the system, the n-best list data 915 may only indicate the domains that are likely to be able to execute the user input represented in the ASR output data 910. In yet another example, the shortlister component 850 may implement thresholding such that the n-best list data 915 may indicate no more than a maximum number of domains that may execute the user input represented in the ASR output data 910. In an example, the threshold number of domains that may be represented in the n-best list data 915 is ten. In another example, the domains included in the n-best list data 915 may be limited by a threshold a score, where only domains indicating a likelihood to handle the user input is above a certain score (as determined by processing the ASR output data 910 by the shortlister component 850 relative to such domains) are included in the n-best list data 915.

The ASR output data 910 may correspond to more than one ASR hypothesis. When this occurs, the shortlister component 850 may output a different n-best list (represented in the n-best list data 915) for each ASR hypothesis. Alternatively, the shortlister component 850 may output a single n-best list representing the domains that are related to the multiple ASR hypotheses represented in the ASR output data 910.

As indicated above, the shortlister component 850 may implement thresholding such that an n-best list output therefrom may include no more than a threshold number of entries. If the ASR output data 910 includes more than one ASR hypothesis, the n-best list output by the shortlister component 850 may include no more than a threshold number of entries irrespective of the number of ASR hypotheses output by the ASR component 250. Alternatively or in addition, the n-best list output by the shortlister component 850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 910, the shortlister component 850 may generate confidence scores representing likelihoods that domains relate to the ASR output data 910. If the shortlister component 850 implements a different trained model for each domain, the shortlister component 850 may generate a different confidence score for each individual domain trained model that is run. If the shortlister component 850 runs the models of every domain when ASR output data 910 is received, the shortlister component 850 may generate a different confidence score for each domain of the system. If the shortlister component 850 runs the models of only the domains that are associated with skills indicated as enabled in a user profile associated with the device 110 and/or user that originated the user input, the shortlister component 850 may only generate a different confidence score for each domain associated with at least one enabled skill. If the shortlister component 850 implements a single trained model with domain specifically trained portions, the shortlister component 850 may generate a different confidence score for each domain who's specifically trained portion is run. The shortlister component 850 may perform matrix vector modification to obtain confidence scores for all domains of the system in a single instance of processing of the ASR output data 910.

N-best list data 915 including confidence scores that may be output by the shortlister component 850 may be represented as, for example:

Search domain, 0.67
Recipe domain, 0.62
Information domain, 0.57
Shopping domain, 0.42

As indicated, the confidence scores output by the shortlister component 850 may be numeric values. The confidence scores output by the shortlister component 850 may alternatively be binned values (e.g., high, medium, low).

The n-best list may only include entries for domains having a confidence score satisfying (e.g., equaling or exceeding) a minimum threshold confidence score. Alternatively, the shortlister component 850 may include entries for all domains associated with user enabled skills, even if one or more of the domains are associated with confidence scores that do not satisfy the minimum threshold confidence score.

The shortlister component 850 may consider other data 920 when determining which domains may relate to the user input represented in the ASR output data 910 as well as respective confidence scores. The other data 920 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 920 may include an indicator of the user associated with the ASR output data 910, for example as determined by a user recognition component.

The other data 920 may be character embedded prior to being input to the shortlister component 850. The other data 920 may alternatively be embedded using other techniques known in the art prior to being input to the shortlister component 850.

The other data 920 may also include data indicating the domains associated with skills that are enabled with respect to the device 110 and/or user that originated the user input. The shortlister component 850 may use such data to determine which domain-specific trained models to run. That is, the shortlister component 850 may determine to only run the trained models associated with domains that are associated with user-enabled skills. The shortlister component 850 may alternatively use such data to alter confidence scores of domains.

As an example, considering two domains, a first domain associated with at least one enabled skill and a second domain not associated with any user-enabled skills of the user that originated the user input, the shortlister component 850 may run a first model specific to the first domain as well as a second model specific to the second domain. Alternatively, the shortlister component 850 may run a model configured to determine a score for each of the first and second domains. The shortlister component 850 may determine a same confidence score for each of the first and second domains in the first instance. The shortlister component 850 may then alter those confidence scores based on which domains is associated with at least one skill enabled by the present user. For example, the shortlister component 850 may increase the confidence score associated with the domain associated with at least one enabled skill while leaving the confidence score associated with the other domain the same. Alternatively, the shortlister component 850 may leave the confidence score associated with the domain associated with at least one enabled skill the same while decreasing the confidence score associated with the other domain. Moreover, the shortlister component 850 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 850 receives the ASR output data 910, the shortlister component 850 may determine whether profile data associated with the user and/or device 110 that originated the command includes an indication of enabled skills.

The other data 920 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 850 may use such data to determine which domain-specific trained models to run. For example, if the device 110 corresponds to a displayless type device, the shortlister component 850 may determine not to run trained models specific to domains that output video data. The shortlister component 850 may alternatively use such data to alter confidence scores of domains.

As an example, considering two domains, one that outputs audio data and another that outputs video data, the shortlister component 850 may run a first model specific to the domain that generates audio data as well as a second model specific to the domain that generates video data. Alternatively the shortlister component 850 may run a model configured to determine a score for each domain. The shortlister component 850 may determine a same confidence score for each of the domains in the first instance. The shortlister component 850 may then alter the original confidence scores based on the type of the device 110 that originated the user input corresponding to the ASR output data 910. For example, if the device 110 is a displayless device, the shortlister component 850 may increase the confidence score associated with the domain that generates audio data while leaving the confidence score associated with the domain that generates video data the same. Alternatively, if the device 110 is a displayless device, the shortlister component 850 may leave the confidence score associated with the domain that generates audio data the same while decreasing the confidence score associated with the domain that generates video data. Moreover, if the device 110 is a displayless device, the shortlister component 850 may increase the confidence score associated with the domain that generates audio data as well as decrease the confidence score associated with the domain that generates video data.

The type of device information represented in the other data 920 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 920 may represent the smart TV of other display device, and not the displayless device that captured the spoken user input.

The other data 920 may also include data indicating the user input originating device's speed, location, or other mobility information. For example, the device may correspond to a vehicle including a display. If the vehicle is moving, the shortlister component 850 may decrease the confidence score associated with a domain that generates video data as it may be undesirable to output video content to a user while the user is driving. The device may output data to the system(s) 120 indicating when the device is moving.

The other data 920 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 850 may use such data to alter confidence scores of domains. For example, the shortlister component 850 may run a first model specific to a first domain as well as a second model specific to a second domain. Alternatively, the shortlister component 850 may run a model configured to determine a score for each domain. The shortlister component 850 may also determine a same confidence score for each of the domains in the first instance. The shortlister component 850 may then alter the original confidence scores based on the first domain being invoked to cause the system to output content while the current user input was received. Based on the first domain being invoked, the shortlister component 850 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 915 generated by the shortlister component 850 as well as the different types of other data 920 considered by the shortlister component 850 are configurable. For example, the shortlister component 850 may update confidence scores as more other data 920 is considered. For further example, the n-best list data 915 may exclude relevant domains if thresholding is implemented. Thus, for example, the shortlister component 850 may include an indication of a domain in the n-best list 915 unless the shortlister component 850 is one hundred percent confident that the domain may not execute the user input represented in the ASR output data 910 (e.g., the shortlister component 850 determines a confidence score of zero for the domain).

The shortlister component 850 may send the ASR output data 910 to recognizers 863 associated with domains represented in the n-best list data 915. Alternatively, the shortlister component 850 may send the n-best list data 915 or some other indicator of the selected subset of domains to another component (such as the orchestrator component 230) which may in turn send the ASR output data 910 to the recognizers 863 corresponding to the domains included in the n-best list data 915 or otherwise indicated in the indicator. If the shortlister component 850 generates an n-best list representing domains without any associated confidence scores, the shortlister component 850/orchestrator component 230 may send the ASR output data 910 to recognizers 863 associated with domains that the shortlister component 850 determines may execute the user input. If the shortlister component 850 generates an n-best list representing domains with associated confidence scores, the shortlister component 850/orchestrator component 230 may send the ASR output data 910 to recognizers 863 associated with domains associated with confidence scores satisfying (e.g., meeting or exceeding) a threshold minimum confidence score.

A recognizer 863 may output tagged text data generated by an NER component 862 and an IC component 864, as described herein above. The NLU component 260 may compile the output tagged text data of the recognizers 863 into a single cross-domain n-best list 940 and may send the cross-domain n-best list 940 to a pruning component 950. Each entry of tagged text (e.g., each NLU hypothesis) represented in the cross-domain n-best list data 940 may be associated with a respective score indicating a likelihood that the NLU hypothesis corresponds to the domain associated with the recognizer 863 from which the NLU hypothesis was output. For example, the cross-domain n-best list data 940 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 950 may sort the NLU hypotheses represented in the cross-domain n-best list data 940 according to their respective scores. The pruning component 950 may perform score thresholding with respect to the cross-domain NLU hypotheses. For example, the pruning component 950 may select NLU hypotheses associated with scores satisfying (e.g., meeting and/or exceeding) a threshold score. The pruning component 950 may also or alternatively perform number of NLU hypothesis thresholding. For example, the pruning component 950 may select the top scoring NLU hypothesis(es). The pruning component 950 may output a portion of the NLU hypotheses input thereto. The purpose of the pruning component 950 is to create a reduced list of NLU hypotheses so that downstream, more resource intensive, processes may only operate on the NLU hypotheses that most likely represent the user's intent.

The NLU component 260 may include a light slot filler component 952. The light slot filler component 952 can take text from slots represented in the NLU hypotheses output by the pruning component 950 and alter them to make the text more easily processed by downstream components. The light slot filler component 952 may perform low latency operations that do not involve heavy operations such as reference to a knowledge base (e.g., 872). The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-domain n-best list data 960.

The cross-domain n-best list data 960 may be input to an entity resolution component 970. The entity resolution component 970 can apply rules or other instructions to standardize labels or tokens from previous stages into an intent/slot representation. The precise transformation may depend on the domain. For example, for a travel domain, the entity resolution component 970 may transform text corresponding to "Boston airport" to the standard BOS three-letter code referring to the airport. The entity resolution component 970 can refer to a knowledge base (e.g., 872) that is used to specifically identify the precise entity referred to in each slot of each NLU hypothesis represented in the cross-domain n-best list data 960. Specific intent/slot combinations may also be tied to a particular source, which may then be used to resolve the text. In the example "play songs by the stones," the entity resolution component 970 may reference a personal music catalog, Amazon Music account, a user profile, or the like. The entity resolution component 970 may output an altered n-best list that is based on the cross-domain n-best list 960 but that includes more detailed information (e.g., entity IDs) about the specific entities mentioned in the slots and/or more detailed slot data that can eventually be used by a skill. The NLU component 260 may include multiple entity resolution components 970 and each entity resolution component 970 may be specific to one or more domains.

The NLU component 260 may include a reranker 990. The reranker 990 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 970.

The reranker 990 may apply re-scoring, biasing, or other techniques. The reranker 990 may consider not only the data output by the entity resolution component 970, but may also consider other data 991. The other data 991 may include a variety of information. For example, the other data 991 may include skill rating or popularity data. For example, if one skill has a high rating, the reranker 990 may increase the score of a NLU hypothesis that may be processed by the skill. The other data 991 may also include information about skills that have been enabled by the user that originated the user input. For example, the reranker 990 may assign higher scores to NLU hypothesis that may be processed by enabled skills than NLU hypothesis that may be processed by non-enabled skills. The other data 991 may also include data indicating user usage history, such as if the user that originated the user input regularly uses a particular skill or does so at particular times of day. The other data 991 may additionally include data indicating date, time, location, weather, type of device 110, user identifier, context, as well as other information. For example, the reranker 990 may consider when any particular skill is currently active (e.g., music being played, a game being played, etc.).

As illustrated and described, the entity resolution component 970 is implemented prior to the reranker 990. The entity resolution component 970 may alternatively be implemented after the reranker 990. Implementing the entity resolution component 970 after the reranker 990 limits the NLU hypotheses processed by the entity resolution component 970 to only those hypotheses that successfully pass through the reranker 990.

The reranker 990 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2A). The NLU component 260 may separately perform NLU processing described above with respect to domains associated with skills that are at least partially implemented as part of the skill system(s) 125. In an example, the shortlister component 850 may only process with respect to these latter domains. Results of these two NLU processing paths may be merged into NLU output data 985, which may be sent to a post-NLU ranker 265, which may be implemented by the system(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 985, skill result data 930, and the other data 920 in order to output ranked output data 925. The ranked output data 925 may include an n-best list where the NLU hypotheses in the NLU results data 985 are reordered such that the n-best list in the ranked output data 925 represents a prioritized list of skills to respond to a user input as determined by the post-NLU ranker 265. The ranked output data 925 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 985 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 930 based on the first NLU hypothesis and the second NLU hypothesis, respectively. For example, the post-NLU ranker 265 may send the first NLU hypothesis to the first skill 190a along with a request for the first skill 190a to at least partially execute with respect to the first NLU hypothesis. The post-NLU ranker 265 may also send the second NLU hypothesis to the second skill 190b along with a request for the second skill 190b to at least partially execute with respect to the second NLU hypothesis. The post-NLU ranker 265 receives, from the first skill 190a, first result data 930a generated from the first skill 190a's execution with respect to the first NLU hypothesis. The post-NLU ranker 265 also receives, from the second skill 190b, second results data 930b generated from the second skill 190b's execution with respect to the second NLU hypothesis.

The result data 930 may include various portions. For example, the result data 930 may include content (e.g., audio data, text data, and/or video data) to be output to a user. The result data 930 may also include a unique identifier used by the system(s) 120 and/or the skill system(s) 125 to locate the data to be output to a user. The result data 930 may also include an instruction. For example, if the user input corresponds to "turn on the light," the result data 930 may include an instruction causing the system to turn on a light associated with a profile of the device (110a/110b) and/or user.

The post-NLU ranker 265 may consider the first result data 930a and the second result data 930b to alter the first confidence score and the second confidence score of the first NLU hypothesis and the second NLU hypothesis, respectively. That is, the post-NLU ranker 265 may generate a third confidence score based on the first result data 930a and the first confidence score. The third confidence score may correspond to how likely the post-NLU ranker 265 determines the first skill will correctly respond to the user input. The post-NLU ranker 265 may also generate a fourth confidence score based on the second result data 930b and the second confidence score. One skilled in the art will appreciate that a first difference between the third confidence score and the fourth confidence score may be greater than a second difference between the first confidence score and the second confidence score. The post-NLU ranker 265 may also consider the other data 920 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 930 associated with the skill 190 with the highest altered confidence score to be the data output in response to the current user input. The post-NLU ranker 265 may also consider the ASR output data 910 to alter the NLU hypotheses confidence scores.

The orchestrator component 230 may, prior to sending the NLU results data 985 to the post-NLU ranker 265, associate intents in the NLU hypotheses with skills 190. For example, if a NLU hypothesis includes a <PlayMusic> intent, the orchestrator component 230 may associate the NLU hypothesis with one or more skills 190 that can execute the <PlayMusic> intent. Thus, the orchestrator component 230 may send the NLU results data 985, including NLU hypotheses paired with skills 190, to the post-NLU ranker 265. In response to ASR output data 910 corresponding to "what should I do for dinner today," the orchestrator component 230 may generates pairs of skills 190 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill 190, paired with a NLU hypothesis in the NLU output data 985, to provide result data 930 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 190 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 265 may query each of the skills 190 in parallel or substantially in parallel.

A skill 190 may provide the post-NLU ranker 265 with various data and indications in response to the post-NLU ranker 265 soliciting the skill 190 for result data 930. A skill 190 may simply provide the post-NLU ranker 265 with an indication of whether or not the skill can execute with respect to the NLU hypothesis it received. A skill 190 may also or alternatively provide the post-NLU ranker 265 with output data generated based on the NLU hypothesis it received. In some situations, a skill 190 may need further information in addition to what is represented in the received NLU hypothesis to provide output data responsive to the user input. In these situations, the skill 190 may provide the post-NLU ranker 265 with result data 930 indicating slots of a framework that the skill 190 further needs filled or entities that the skill 190 further needs resolved prior to the skill 190 being able to provided result data 930 responsive to the user input. The skill 190 may also provide the post-NLU ranker 265 with an instruction and/or computer-generated speech indicating how the skill 190 recommends the system solicit further information needed by the skill 190. The skill 190 may further provide the post-NLU ranker 265 with an indication of whether the skill 190 will have all needed information after the user provides additional information a single time, or whether the skill 190 will need the user to provide various kinds of additional information prior to the skill 190 having all needed information. According to the above example, skills 190 may provide the post-NLU ranker 265 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 930 includes an indication provided by a skill 190 indicating whether or not the skill 190 can execute with respect to a NLU hypothesis; data generated by a skill 190 based on a NLU hypothesis; as well as an indication provided by a skill 190 indicating the skill 190 needs further information in addition to what is represented in the received NLU hypothesis.

The post-NLU ranker 265 uses the result data 930 provided by the skills 190 to alter the NLU processing confidence scores generated by the reranker 990. That is, the post-NLU ranker 265 uses the result data 930 provided by the queried skills 190 to create larger differences between the NLU processing confidence scores generated by the reranker 990. Without the post-NLU ranker 265, the system may not be confident enough to determine an output in response to a user input, for example when the NLU hypotheses associated with multiple skills are too close for the system to confidently determine a single skill 190 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 190 that provide result data 930 responsive to NLU hypotheses over skills 190 that provide result data 930 corresponding to an indication that further information is needed, as well as skills 190 that provide result data 930 indicating they can provide multiple responses to received NLU hypotheses. For example, the post-NLU ranker 265 may generate a first score for a first skill 190a that is greater than the first skill's NLU confidence score based on the first skill 190a providing result data 930a including a response to a NLU hypothesis. For further example, the post-NLU ranker 265 may generate a second score for a second skill 190b that is less than the second skill's NLU confidence score based on the second skill 190b providing result data 930b indicating further information is needed for the second skill 190b to provide a response to a NLU hypothesis. Yet further, for example, the post-NLU ranker 265 may generate a third score for a third skill 190c that is less than the third skill's NLU confidence score based on the third skill 190c providing third result data 930c indicating the third skill 190c can provide multiple responses to a NLU hypothesis.

The post-NLU ranker 265 may consider other data 920 in determining scores. The other data 920 may include rankings associated with the queried skills 190. A ranking may be a system ranking or a user-specific ranking. A ranking may indicate a veracity of a skill from the perspective of one or more users of the system. For example, the post-NLU ranker 265 may generate a first score for a first skill 190a that is greater than the first skill's NLU processing confidence score based on the first skill 190a being associated with a high ranking. For further example, the post-NLU ranker 265 may generate a second score for a second skill 190b that is less than the second skill's NLU processing confidence score based on the second skill 190b being associated with a low ranking.

The other data 920 may include information indicating whether or not the user that originated the user input has enabled one or more of the queried skills 190. For example, the post-NLU ranker 265 may generate a first score for a first skill 190a that is greater than the first skill's NLU processing confidence score based on the first skill 190a being enabled by the user that originated the user input. For further example, the post-NLU ranker 265 may generate a second score for a second skill 190b that is less than the second skill's NLU processing confidence score based on the second skill 190b not being enabled by the user that originated the user input. When the post-NLU ranker 265 receives the NLU results data 985, the post-NLU ranker 265 may determine whether profile data, associated with the user and/or device that originated the user input, includes indications of enabled skills.

The other data 920 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 920 may include information indicating the veracity of the result data 930 provided by a skill 190. For example, if a user says "tell me a recipe for pasta sauce," a first skill 190a may provide the post-NLU ranker 265 with first result data 930a corresponding to a first recipe associated with a five star rating and a second skill 190b may provide the post-NLU ranker 265 with second result data 930b corresponding to a second recipe associated with a one star rating. In this situation, the post-NLU ranker 265 may increase the NLU processing confidence score associated with the first skill 190a based on the first skill 190a providing the first result data 930a associated with the five star rating and/or decrease the NLU processing confidence score associated with the second skill 190b based on the second skill 190b providing the second result data 930b associated with the one star rating.

The other data 920 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 190a corresponding to a room service skill associated with the hotel and/or decrease the NLU processing confidence score associated with a second skill 190b corresponding to a food skill not associated with the hotel.

The other data 920 may include information indicating a location of the device and/or user that originated the user input. The system may be configured with skills 190 that may only operate with respect to certain geographic locations. For example, a user may provide a user input corresponding to "when is the next train to Portland." A first skill 190a may operate with respect to trains that arrive at, depart from, and pass through Portland, Oregon. A second skill 190b may operate with respect to trains that arrive at, depart from, and pass through Portland, Maine. If the device and/or user that originated the user input is located in Seattle, Washington, the post-NLU ranker 265 may increase the NLU processing confidence score associated with the first skill 190a and/or decrease the NLU processing confidence score associated with the second skill 190b. Likewise, if the device and/or user that originated the user input is located in Boston, Massachusetts, the post-NLU ranker 265 may increase the NLU processing confidence score associated with the second skill 190b and/or decrease the NLU processing confidence score associated with the first skill 190a.

The other data 920 may include information indicating a time of day. The system may be configured with skills 190 that operate with respect to certain times of day. For example, a user may provide a user input corresponding to "order me food." A first skill 190a may generate first result data 930a corresponding to breakfast. A second skill 190b may generate second result data 930b corresponding to dinner. If the system(s) 120 receives the user input in the morning, the post-NLU ranker 265 may increase the NLU processing confidence score associated with the first skill 190a and/or decrease the NLU processing score associated with the second skill 190b. If the system(s) 120 receives the user input in the afternoon or evening, the post-NLU ranker 265 may increase the NLU processing confidence score associated with the second skill 190b and/or decrease the NLU processing confidence score associated with the first skill 190a.

The other data 920 may include information indicating user preferences. The system may include multiple skills 190 configured to execute in substantially the same manner. For example, a first skill 190a and a second skill 190b may both be configured to order food from respective restaurants. The system may store a user preference (e.g., in the profile storage 270) that is associated with the user that provided the user input to the system(s) 120 as well as indicates the user prefers the first skill 190a over the second skill 190b. Thus, when the user provides a user input that may be executed by both the first skill 190a and the second skill 190b, the post-NLU ranker 265 may increase the NLU processing confidence score associated with the first skill 190a and/or decrease the NLU processing confidence score associated with the second skill 190b.

The other data 920 may include information indicating system usage history associated with the user that originated the user input. For example, the system usage history may indicate the user originates user inputs that invoke a first skill 190a more often than the user originates user inputs that invoke a second skill 190b. Based on this, if the present user input may be executed by both the first skill 190a and the second skill 190b, the post-NLU ranker 265 may increase the NLU processing confidence score associated with the first skill 190a and/or decrease the NLU processing confidence score associated with the second skill 190b.

The other data 920 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 190a that generates audio data. The post-NLU ranker 265 may also or alternatively decrease the NLU processing confidence score associated with a second skill 190b that generates image data or video data.

The other data 920 may include information indicating how long it took a skill 190 to provide result data 930 to the post-NLU ranker 265. When the post-NLU ranker 265 multiple skills 190 for result data 930, the skills 190 may respond to the queries at different speeds. The post-NLU ranker 265 may implement a latency budget. For example, if the post-NLU ranker 265 determines a skill 190 responds to the post-NLU ranker 265 within a threshold amount of time from receiving a query from the post-NLU ranker 265, the post-NLU ranker 265 may increase the NLU processing confidence score associated with the skill 190. Conversely, if the post-NLU ranker 265 determines a skill 190 does not respond to the post-NLU ranker 265 within a threshold amount of time from receiving a query from the post-NLU ranker 265, the post-NLU ranker 265 may decrease the NLU processing confidence score associated with the skill 190.

It has been described that the post-NLU ranker 265 uses the other data 920 to increase and decrease NLU processing confidence scores associated with various skills 190 that the post-NLU ranker 265 has already requested result data from. Alternatively, the post-NLU ranker 265 may use the other data 920 to determine which skills 190 to request result data from. For example, the post-NLU ranker 265 may use the other data 920 to increase and/or decrease NLU processing confidence scores associated with skills 190 associated with the NLU results data 985 output by the NLU component 260. The post-NLU ranker 265 may select n-number of top scoring altered NLU processing confidence scores. The post-NLU ranker 265 may then request result data 930 from only the skills 190 associated with the selected n-number of NLU processing confidence scores.

As described, the post-NLU ranker 265 may request result data 930 from all skills 190 associated with the NLU results data 985 output by the NLU component 260. Alternatively, the system(s) 120 may prefer result data 930 from skills implemented entirely by the system(s) 120 rather than skills at least partially implemented by the skill system(s) 125. Therefore, in the first instance, the post-NLU ranker 265 may request result data 930 from only skills associated with the NLU results data 985 and entirely implemented by the system(s) 120. The post-NLU ranker 265 may only request result data 930 from skills associated with the NLU results data 985, and at least partially implemented by the skill system(s) 125, if none of the skills, wholly implemented by the system(s) 120, provide the post-NLU ranker 265 with result data 930 indicating either data response to the NLU results data 985, an indication that the skill can execute the user input, or an indication that further information is needed.

As indicated above, the post-NLU ranker 265 may request result data 930 from multiple skills 190. If one of the skills 190 provides result data 930 indicating a response to a NLU hypothesis and the other skills provide result data 930 indicating either they cannot execute or they need further information, the post-NLU ranker 265 may select the result data 930 including the response to the NLU hypothesis as the data to be output to the user. If more than one of the skills 190 provides result data 930 indicating responses to NLU hypotheses, the post-NLU ranker 265 may consider the other data 920 to generate altered NLU processing confidence scores, and select the result data 930 of the skill associated with the greatest score as the data to be output to the user.

A system that does not implement the post-NLU ranker 265 may select the highest scored NLU hypothesis in the NLU results data 985. The system may send the NLU hypothesis to a skill 190 associated therewith along with a request for output data. In some situations, the skill 190 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 985 to provide result data 930 to the post-NLU ranker 265 prior to the post-NLU ranker 265 ultimately determining the skill 190 to be invoked to respond to the user input. Some of the skills 190 may provide result data 930 indicating responses to NLU hypotheses while other skills 190 may providing result data 930 indicating the skills cannot provide responsive data. Whereas a system not implementing the post-NLU ranker 265 may select one of the skills 190 that could not provide a response, the post-NLU ranker 265 only selects a skill 190 that provides the post-NLU ranker 265 with result data corresponding to a response, indicating further information is needed, or indicating multiple responses can be generated.

The post-NLU ranker 265 may select result data 930, associated with the skill 190 associated with the highest score, for output to the user. Alternatively, the post-NLU ranker 265 may output ranked output data 925 indicating skills 190 and their respective post-NLU ranker rankings. Since the post-NLU ranker 265 receives result data 930, potentially corresponding to a response to the user input, from the skills 190 prior to post-NLU ranker 265 selecting one of the skills or outputting the ranked output data 925, little to no latency occurs from the time skills provide result data 930 and the time the system outputs responds to the user.

If the post-NLU ranker 265 selects result audio data to be output to a user and the system determines content should be output audibly, the post-NLU ranker 265 (or another component of the system(s) 120) may cause the device 110a and/or the device 110b to output audio corresponding to the result audio data. If the post-NLU ranker 265 selects result text data to output to a user and the system determines content should be output visually, the post-NLU ranker 265 (or another component of the system(s) 120) may cause the device 110b to display text corresponding to the result text data. If the post-NLU ranker 265 selects result audio data to output to a user and the system determines content should be output visually, the post-NLU ranker 265 (or another component of the system(s) 120) may send the result audio data to the ASR component 250. The ASR component 250 may generate output text data corresponding to the result audio data. The system(s) 120 may then cause the device 110b to display text corresponding to the output text data. If the post-NLU ranker 265 selects result text data to output to a user and the system determines content should be output audibly, the post-NLU ranker 265 (or another component of the system(s) 120) may send the result text data to the TTS component 280. The TTS component 280 may generate output audio data (corresponding to computer-generated speech) based on the result text data. The system(s) 120 may then cause the device 110a and/or the device 110b to output audio corresponding to the output audio data.

As described, a skill 190 may provide result data 930 either indicating a response to the user input, indicating more information is needed for the skill 190 to provide a response to the user input, or indicating the skill 190 cannot provide a response to the user input. If the skill 190 associated with the highest post-NLU ranker score provides the post-NLU ranker 265 with result data 930 indicating a response to the user input, the post-NLU ranker 265 (or another component of the system(s) 120, such as the orchestrator component 230) may simply cause content corresponding to the result data 930 to be output to the user. For example, the post-NLU ranker 265 may send the result data 930 to the orchestrator component 230. The orchestrator component 230 may cause the result data 930 to be sent to the device (110a/110b), which may output audio and/or display text corresponding to the result data 930. The orchestrator component 230 may send the result data 930 to the ASR component 250 to generate output text data and/or may send the result data 930 to the TTS component 280 to generate output audio data, depending on the situation.

The skill 190 associated with the highest post-NLU ranker score may provide the post-NLU ranker 265 with result data 930 indicating more information is needed as well as instruction data. The instruction data may indicate how the skill 190 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 265 may simply cause the received instruction data be output by the device (110a/110b). Alternatively, the instruction data may be in a format that is not capable of being output by the device (110a/110b). When this occurs, the post-NLU ranker 265 may cause the ASR component 250 or the TTS component 280 to process the instruction data, depending on the situation, to generate instruction data that may be output by the device (110a/110b). Once the user provides the system with all further information needed by the skill 190, the skill 190 may provide the system with result data 930 indicating a response to the user input, which may be output by the system as detailed above.

The system may include "informational" skills 190 that simply provide the system with information, which the system outputs to the user. The system may also include "transactional" skills 190 that require a system instruction to execute the user input. Transactional skills 190 include ride sharing skills, flight booking skills, etc. A transactional skill 190 may simply provide the post-NLU ranker 265 with result data 930 indicating the transactional skill 190 can execute the user input. The post-NLU ranker 265 may then cause the system to solicit the user for an indication that the system is permitted to cause the transactional skill 190 to execute the user input. The user-provided indication may be an audible indication or a tactile indication (e.g., activation of a virtual button or input of text via a virtual keyboard). In response to receiving the user-provided indication, the system may provide the transactional skill 190 with data corresponding to the indication. In response, the transactional skill 190 may execute the command (e.g., book a flight, book a train ticket, etc.). Thus, while the system may not further engage an informational skill 190 after the informational skill 190 provides the post-NLU ranker 265 with result data 930, the system may further engage a transactional skill 190 after the transactional skill 190 provides the post-NLU ranker 265 with result data 930 indicating the transactional skill 190 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 230, post-NLU ranker 265, shortlister 850, or other component may be trained and operated according to various machine learning techniques.

Figure 10:
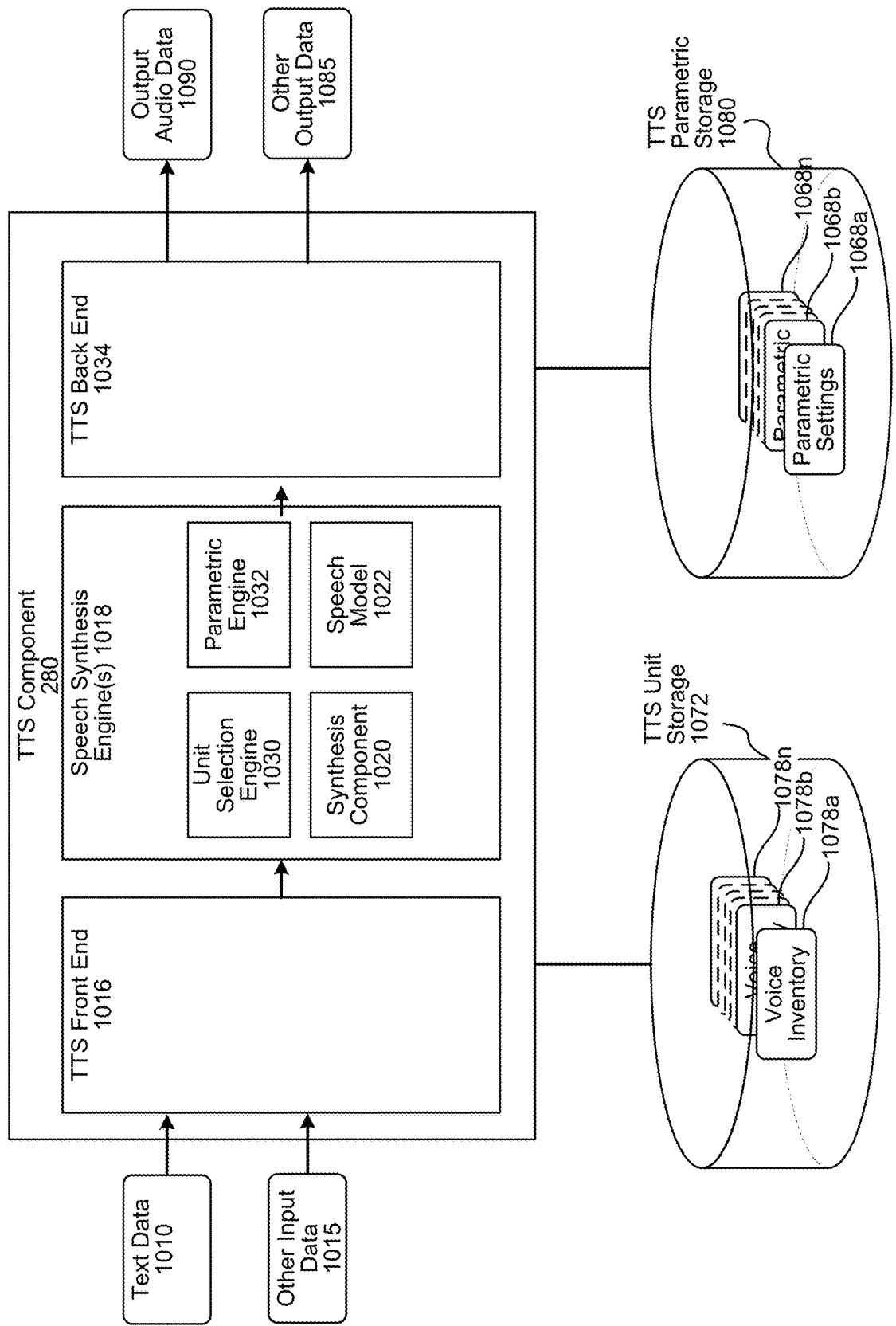
FIG. 10 is a conceptual diagram of text-to-speech components according to embodiments of the present disclosure.

Components of a system that may be used to perform unit selection, parametric TTS processing, and/or model-based audio synthesis are shown in FIG. 10. As shown in FIG. 10, the TTS component/processor 280 may include a TTS front end 1016, a speech synthesis engine 1018, TTS unit storage 1072, TTS parametric storage 1080, and a TTS back end 1034. The TTS unit storage 1072 may include, among other things, voice inventories 1078a-1078n that may include pre-recorded audio segments (called units) to be used by the unit selection engine 1030 when performing unit selection synthesis as described below. The TTS parametric storage 1080 may include, among other things, parametric settings 1068a-1068n that may be used by the parametric synthesis engine 1032 when performing parametric synthesis as described below. A particular set of parametric settings 1068 may correspond to a particular voice profile (e.g., whispered speech, excited speech, etc.).

In various embodiments of the present disclosure, model-based synthesis of audio data may be performed using by a speech model 1022 and a TTS front end 1016. The TTS front end 1016 may be the same as front ends used in traditional unit selection or parametric systems. In other embodiments, some or all of the components of the TTS front end 1016 are based on other trained models. The present disclosure is not, however, limited to any particular type of TTS front end 1016. The speech model 1022 may be used to synthesize speech without requiring the TTS unit storage 1072 or the TTS parametric storage 1080, as described in greater detail below.

TTS component receives text data 1010. Although the text data 1010 in FIG. 10 is input into the TTS component 280, it may be output by other component(s) (such as a skill 190, NLU component 260, NLG component 279 or other component) and may be intended for output by the system. Thus in certain instances text data 1010 may be referred to as "output text data." Further, the data 1010 may not necessarily be text, but may include other data (such as symbols, code, other data, etc.) that may reference text (such as an indicator of a word) that is to be synthesized. Thus data 1010 may come in a variety of forms. The TTS front end 1016 transforms the data 1010 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1018. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1010, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1016 may also process other input data 1015, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1010 and/or the text for a TTS request may be accompanied by separate metadata indicating what text should be whispered (or have some other indicated audio characteristic). The speech synthesis engine 1018 may compare the annotated phonetic units models and information stored in the TTS unit storage 1072 and/or TTS parametric storage 1080 for converting the input text into speech. The TTS front end 1016 and speech synthesis engine 1018 may include their own controller(s)/ processor(s) and memory or they may use the controller/ processor and memory of the server 120, device 110, or other device, for example. Similarly, the instructions for operating the TTS front end 1016 and speech synthesis engine 1018 may be located within the TTS component 280, within the memory and/or storage of the server 120, device 110, or within an external device.

Text data 1010 input into the TTS component 280 may be sent to the TTS front end 1016 for processing. The front end 1016 may include components for performing text normalization, linguistic analysis, linguistic prosody generation, or other such components. During text normalization, the TTS front end 1016 may first process the text input and generate standard text, converting such things as numbers, abbreviations (such as Apt., St., etc.), symbols ($, %, etc.) into the equivalent of written out words.

During linguistic analysis, the TTS front end 1016 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 1072. The linguistic analysis performed by the TTS front end 1016 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 1016 may then perform linguistic prosody generation where the phonetic units are annotated with desired prosodic characteristics, also called acoustic features, which indicate how the desired phonetic units are to be pronounced in the eventual output speech. During this stage the TTS front end 1016 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1016, which may be referred to as a symbolic linguistic representation, may include a sequence of phonetic units annotated with prosodic characteristics. This symbolic linguistic representation may be sent to the speech synthesis engine 1018, which may also be known as a synthesizer, for conversion into an audio waveform of speech for output to an audio output device and eventually to a user. The speech synthesis engine 1018 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1018 may perform speech synthesis using one or more different methods. In one method of synthesis called unit selection, described further below, a unit selection engine 1030 matches the symbolic linguistic representation created by the TTS front end 1016 against a database of recorded speech, such as a database (e.g., TTS unit storage 1072) storing information regarding one or more voice corpuses (e.g., voice inventories 1078a-n). Each voice inventory may correspond to various segments of audio that was recorded by a speaking human, such as a voice actor, where the segments are stored in an individual inventory 1078 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1030 may then use the information about each unit to select units to be joined together to form the speech output.

The unit selection engine 1030 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1020) to form output audio data 1090 representing synthesized speech. Using all the information in the unit database, a unit selection engine 1030 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1032, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1020) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS unit storage 1072 based on feedback of the results of TTS processing, thus enabling the TTS component 280 to improve speech synthesis.

The TTS unit storage 1072 may be customized for an individual user based on his/her individualized desired speech output. In particular, the speech unit stored in a unit database may be taken from input audio data of the user speaking. For example, to create the customized speech output of the system, the system may be configured with multiple voice inventories 1078*a*-1078*n*, where each unit database is configured with a different "voice" to match desired speech qualities. Such voice inventories may also be linked to user accounts. The voice selected by the TTS component 280 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1078 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1068) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1030 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1030. As part of unit selection, the unit selection engine 1030 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1072 or in another storage component. For example, different unit selection databases may be stored in TTS unit storage 1072. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1018 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 1032 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1016.

The parametric synthesis engine 1032 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1018, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1032 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1032 may lead to a number of potential audio output sequences. Based on the acoustic model and other potential models, the potential audio output sequences may be scored according to a confidence level of the parametric synthesis engine 1032. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1068, which may represent acoustic settings matching a particular parametric "voice", may be used by the synthesis component 1020 to ultimately create the output audio data 1090.

When performing unit selection, after a unit is selected by the unit selection engine 1030, the audio data corresponding to the unit may be passed to the synthesis component 1020. The synthesis component 1020 may then process the audio data of the unit to create modified audio data where the modified audio data reflects a desired audio quality. The synthesis component 1020 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 280. For each unit that corresponds to the selected portion, the synthesis component 1020 may process the audio data for that unit to create a modified unit audio data. The modified unit audio data may then be concatenated to form the output audio data 1090. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 280. In that case, other output data 1085 may be output along with the output audio data 1090 so that an ultimate playback device (e.g., device 110) receives instructions for playback that can assist in creating the desired output audio. Thus, the other output data 1085 may include instructions or other data indicating playback device settings (such as volume, playback rate, etc.) or other data indicating how output audio data including synthesized speech should be output. For example, for whispered speech, the output audio data 1090 may include other output data 1085 that may include a prosody tag or other indicator that instructs the device 110 to slow down the playback of the output audio data 1090, thus making the ultimate audio sound more like whispered speech, which is typically slower than normal speech. In another example, the other output data 1085 may include a volume tag that instructs the device 110 to output the speech at a volume level less than a current volume setting of the device 110, thus improving the quiet whisper effect.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11:
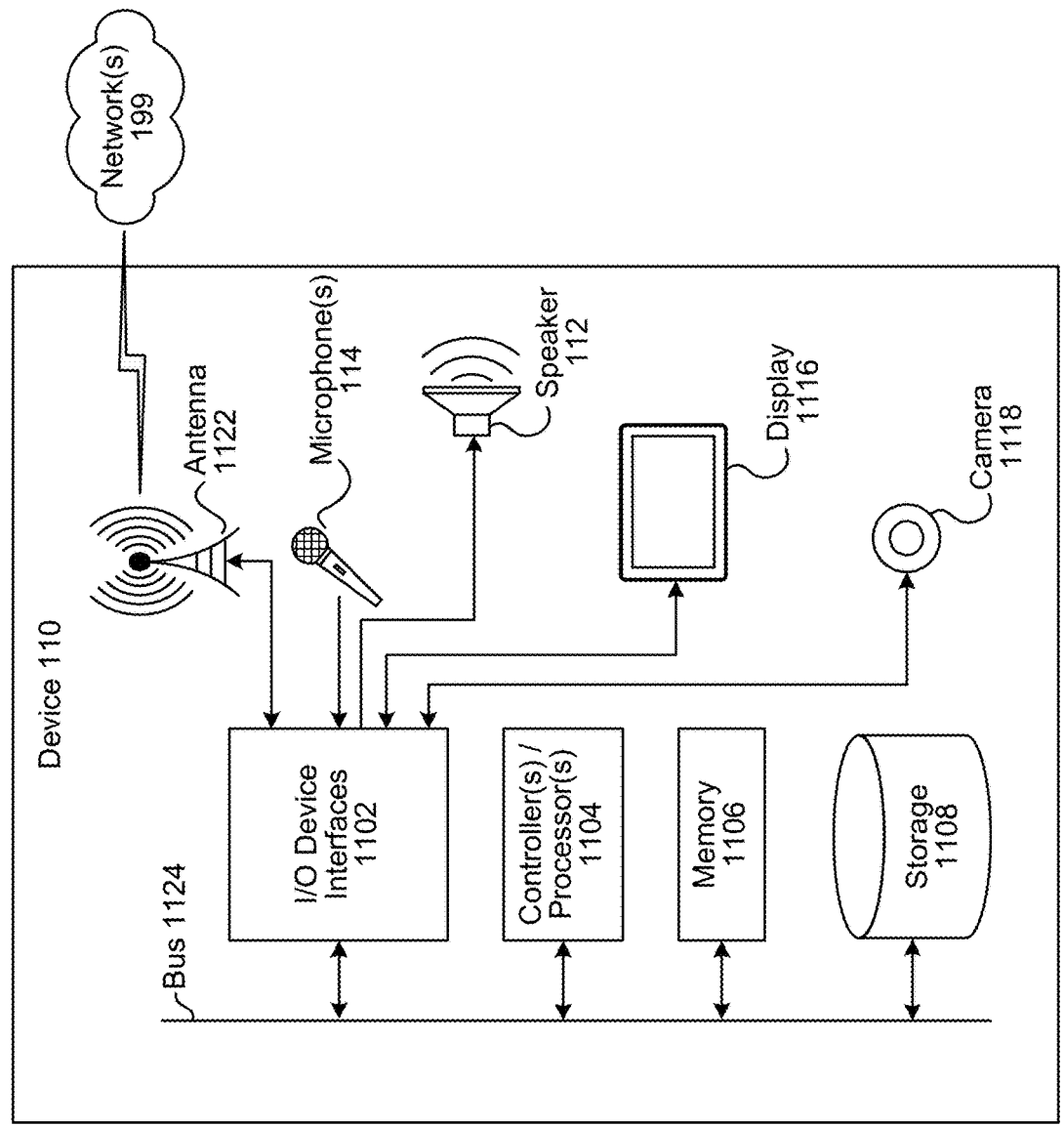
FIG. 11 is a block diagram conceptually illustrating example components of a device, according to embodiments of the present disclosure.
Figure 12:
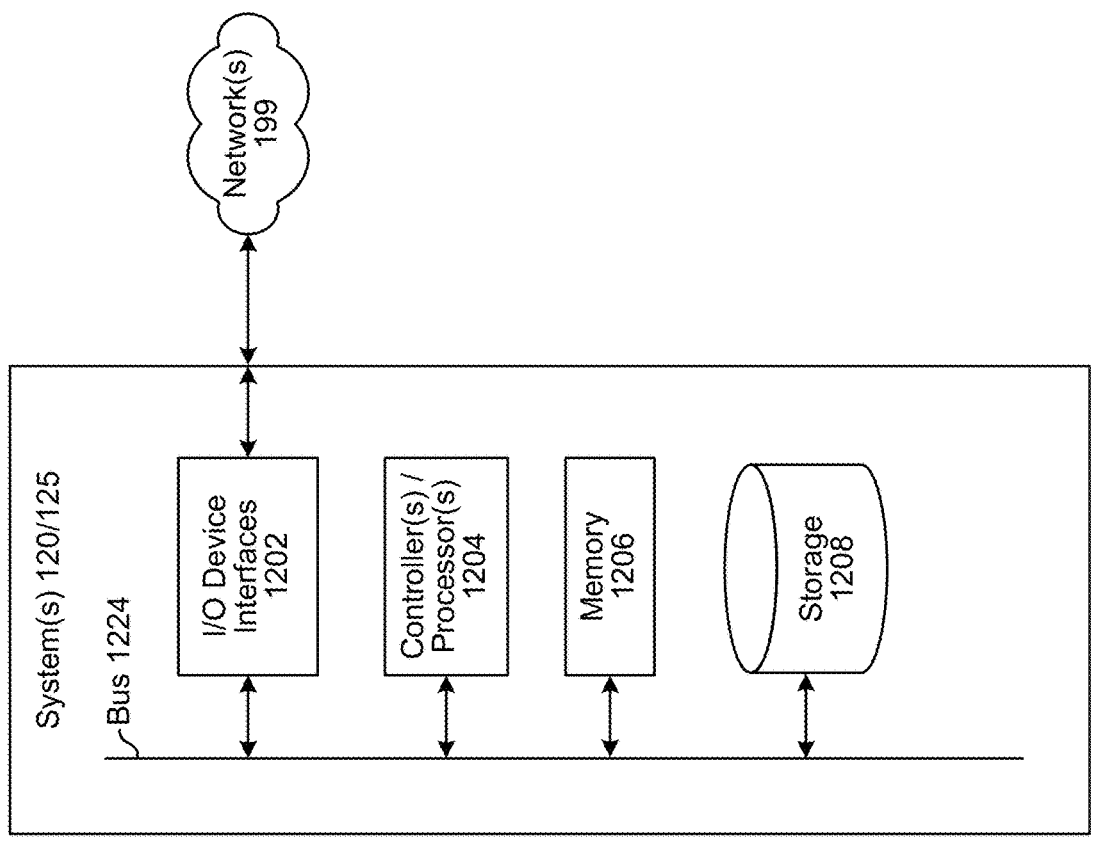
FIG. 12 is a block diagram conceptually illustrating example components of a system, according to embodiments of the present disclosure.

FIG. 11 is a block diagram conceptually illustrating a device 110 that may be used with the system. FIG. 12 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1102/1202).

Computer instructions for operating each device (110/120/125) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125) includes input/output device interfaces (1102/1202). A variety of components may be connected through the input/output device interfaces (1102/1202), as will be discussed further below. Additionally, each device (110/120/125) may include an address/data bus (1124/1224) for conveying data among components of the respective device. Each component within a device (110/120/125) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 112, a wired headset or a wireless headset (not illustrated), or other component capable of outputting audio. The device 110 may also include an audio capture component. The audio capture component may be, for example, a microphone 114 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1122, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1102/1202), processor(s) (1104/1204), memory (1106/1206), and/or storage (1108/1208) of the device(s) 110, natural language command processing system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

Figure 13:
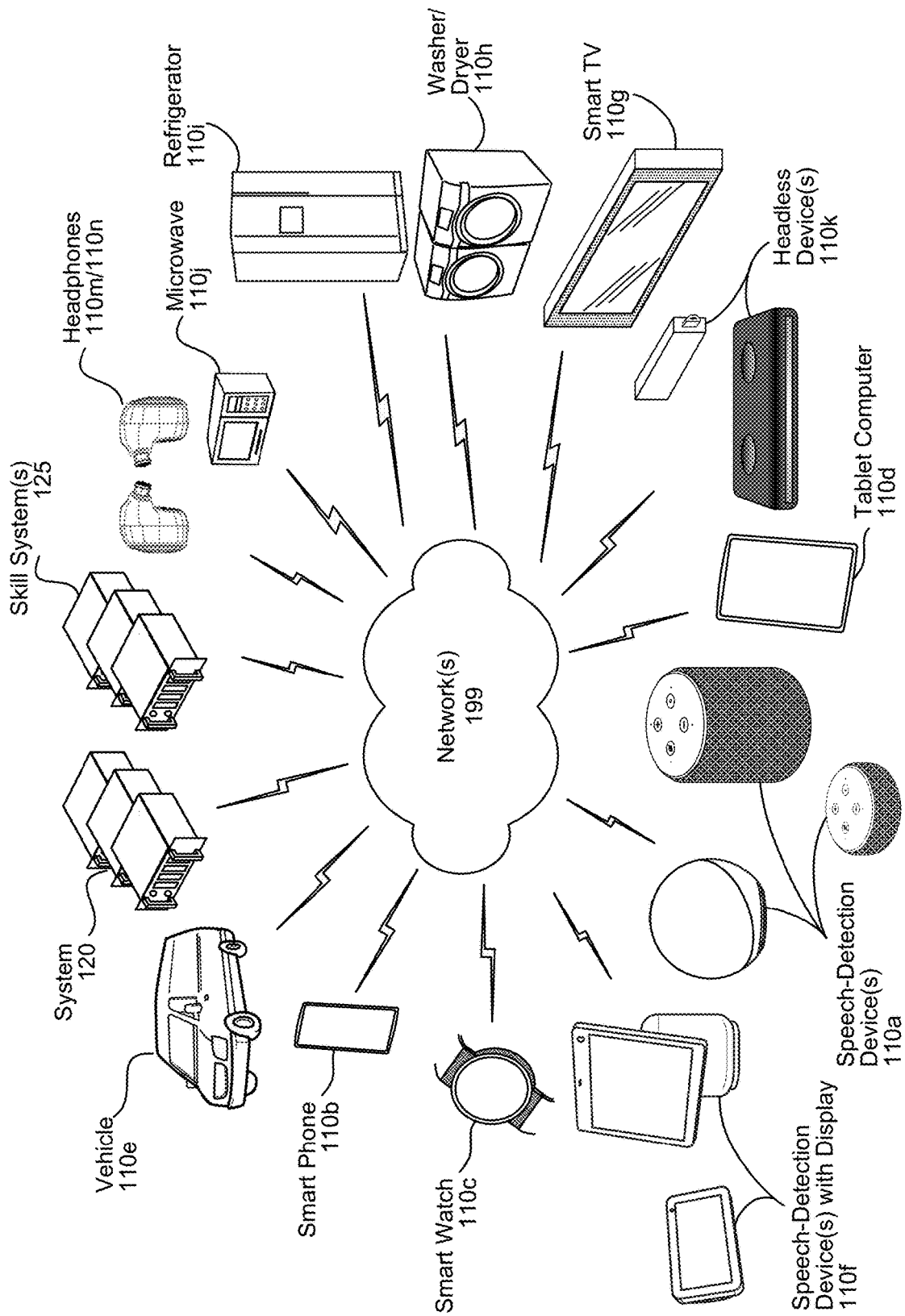
FIG. 13 illustrates an example of a computer network for use with the overall system, according to embodiments of the present disclosure.

As illustrated in FIG. 13, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, and/or headless device(s) 110k (e.g., a device such as a FireTV stick, Echo Auto or the like) may be connected to the network(s) 199 through a wireless service provider, over a WiFi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
    receiving, by a device, first input audio data representing first input audio detected by a microphone of the device, the device including a first component associated with a first command processing subsystem (CPS), a second component associated with a second CPS, and a third component configured to manage operations of the first component and the second component;
    detecting, in the first input audio data, a representation of a first wakeword corresponding to the first CPS;
    sending, to the first component a first indication that the representation of the first wakeword was detected;
    in response to the first indication, sending, to the third component, first data to comprising a first request for authorization to use the first component to initiate a first dialog session between the device and the first CPS;
    receiving, by the first component and from the third component, a first response indicating that the first request has been granted;
    based on the first response, causing the first CPS to perform speech processing on at least a portion of the first input audio data;
    receiving CPS response data from the first CPS;
    outputting, by a speaker of the device, first output audio based on the CPS response data;
    receiving, by the device, second input audio data representing second input audio detected by the microphone;

detecting, in the second input audio data, a first representation of a second wakeword;
sending, to the second component, a second indication that the first representation of the second wakeword was detected;
in response to the second indication, sending, to the third component, second data comprising a second request for authorization to use the second component to initiate a second dialog session with the second CPS;
determining that the first representation of the second wakeword was detected during an interval of time in which the first output audio was being output;
receiving, by the second component and from the third component, a second response indicating that the second request has been denied, wherein denying the second request is based at least in part on the first representation of the second wakeword having been detected during the interval; and
based on the second response, refraining from causing the second CPS to perform speech processing on at least a portion of the second input audio data.

2. The method of claim 1, further comprising:
detecting, in the CPS response data, a second representation of the second wakeword; and
determining to deny the second request based at least in part on the second representation of the second wakeword having been detected in the CPS response data.

3. The method of claim 2, further comprising:
storing, in a storage component of the device, third data representing the first wakeword and fourth data representing the second wakeword, wherein:
the CPS response data represents a natural language output, and
detecting the second representation of the second wakeword includes detecting the fourth data in the CPS response data.

4. The method of claim 1, further comprising:
determining to deny the second request based at least in part on a determination that the portion of the first input audio data is being sent to the first CPS.

5. The method of claim 1, further comprising:
determining to deny the second request based at least in part on a determination that the first CPS is processing the portion of the first input audio data.

6. A method comprising:
receiving, by a device, first input audio data representing first input audio detected by a microphone, the device including a first component associated with a first speech processing system, a second component associated with a second speech processing system, and a third component configured to manage operations of the first component and the second component;
detecting, in the first input audio data, a representation of a first wakeword corresponding to the first speech processing system;
in response to detecting the representation of the first wakeword, sending, to the third component, first data comprising a first request for authorization to use the first component to initiate a first dialog session with the first speech processing system;
receiving, by the first component and from the third component, a first response indicating that the first request has been granted;
based on the first response, causing the first speech processing system to perform speech processing on at least a portion of the first input audio data;
receiving speech processing response data from the first speech processing system;
outputting, by a speaker of the device, first output audio based on the speech processing response data;
receiving, by the device, second input audio data representing second input audio detected by the microphone;
detecting, in the second input audio data, a first representation of a second wakeword;
in response to detecting the first representation of the second wakeword, sending, to the third component, second data comprising a second request for authorization to use the second component to initiate a second dialog session with the second speech processing system;
determining that the first representation of the second wakeword was detected during an interval of time in which the first output audio was being output;
receiving, by the second component and from the third component, a second response indicating that the second request has been denied, wherein denying the second request is further based at least in part on the first representation of the second wakeword having been detected during the interval; and
based on the second response, refraining from causing the second speech processing system to perform speech processing on at least a portion of the second input audio data.

7. The method of claim 6, further comprising:
detecting, in the speech processing response data, a second representation of the second wakeword; and
determining to deny the second request based at least in part on the second representation of the second wakeword having been detected in the speech processing response data.

8. The method of claim 7, further comprising:
storing, in a storage component of the device, at least third data representing the first wakeword and fourth data representing the second wakeword, wherein:
the speech processing response data represents a text of a natural language output, and
detecting the second representation of the second wakeword includes detecting the second data in the speech processing response data.

9. The method of claim 6, further comprising:
detecting, in the first input audio data, a second representation of the second wakeword;
determining that the representation of the first wakeword was detected in a first portion of the first input audio data;
determining that the second representation of the second wakeword was detected in a second portion of the first input audio data;
determining that the second portion was received after the first portion; and
in response to determining that the second portion was received after the first portion, ignoring the second representation of the second wakeword such that the device does not cause the second speech processing system to perform speech processing on second portion of the first input audio data.

10. The method of claim 6, further comprising:
determining to deny the second request based at least in part on a determination that the portion of the first input audio data is being sent to the first speech processing system.

11. The method of claim 6, further comprising:
determining to deny the second request based at least in part on a determination that the first speech processing system is processing the portion of the first input audio data.

12. A device, comprising:
a microphone;
a speaker;
a first component associated with a first speech processing system;
a second component associated with a second speech processing system;
a third component configured to manage operations of the first component and the second component;
at least one processor; and
at least one memory comprising instructions that, when executed by the at least one processor, cause the device to:
receive first input audio data representing first input audio detected by the microphone;
detect, in the first input audio data, a representation of a first wakeword corresponding to the first speech processing system;
in response to detecting the representation of the first wakeword, send, to the third component, first data comprising a first request for authorization to use the first component to initiate a first dialog session with the first speech processing system;
receive, by the first component and from the third component, a first response indicating that the first request has been granted;
based on the first response, cause the first speech processing system to perform speech processing on at least a portion of the first input audio data; receive speech processing response data from the first speech processing system;
output, by the speaker, first output audio based on the speech processing response data;
receive second input audio data representing second input audio detected by the microphone;
detect, in the second input audio data, a first representation of a second wakeword;
in response to detecting the first representation of the second wakeword, send, to the third component, second data comprising a second request for authorization to use the second component to initiate a second dialog session with the second speech processing system;
determine that the first representation of the second wakeword was detected during an interval of time in which the first output audio was being output;
receive, by the second component and from the third component, a second response indicating that the second request has been denied, wherein denying the second request is further based at least in part on the first representation of the second wakeword having been detected during the interval; and
based on the second response, refrain from causing the second speech processing system to perform speech processing on at least a portion of the second input audio data.

13. The device of claim 12, wherein the at least one memory further comprises instructions that, when executed by the at least one processor, further cause the device to:
detect, in the speech processing response data, a second representation of the second wakeword; and
determine to deny the second request based at least in part on the second representation of the second wakeword having been detected in the speech processing response data.

14. The device of claim 13, wherein the at least one memory further comprises instructions that, when executed by the at least one processor, further cause the device to:
store, in the at least one memory, at least third data representing the first wakeword and fourth data representing the second wakeword, wherein:
the speech processing response data represents a text of a natural language output, and
detecting the second representation of the second wakeword includes detecting the second data in the speech processing response data.

15. The device of claim 12, wherein the at least one memory further comprises instructions that, when executed by the at least one processor, further cause the device to:
detect, in the first input audio data, a second representation of the second wakeword;
determine that the representation of the first wakeword was detected in a first portion of the first input audio data;
determine that the second representation of the second wakeword was detected in a second portion of the first input audio data;
determine that the second portion was received after the first portion; and
in response to determining that the second portion was received after the first portion, ignore the second representation of the second wakeword such that the device does not cause the second speech processing system to perform speech processing on the second portion of the first input audio data.

16. The device of claim 12, wherein the at least one memory further comprises instructions that, when executed by the at least one processor, further cause the device to:
determine to deny the second request based at least in part on a determination that the portion of the first input audio data is being sent to the first speech processing system.

17. The device of claim 12, wherein the at least one memory further comprises instructions that, when executed by the at least one processor, further cause the device to:
determine to deny the second request based at least in part on a determination that the first speech processing system is processing the portion of the first input audio data.

* * * * *